(12) United States Patent
Karnas et al.

(10) Patent No.: US 11,750,738 B2
(45) Date of Patent: *Sep. 5, 2023

(54) TELECOMMUNICATIONS DATA MANAGEMENT INTERFACE

(71) Applicant: Somos, Inc., East Brunswick, NJ (US)

(72) Inventors: Ryan Karnas, Mount Pleasant, SC (US); Lalitha Veeramachaneni, Ashburn, VA (US); Dewang Lakhani, Ashburn, VA (US)

(73) Assignee: Somos, Inc., East Brunswick, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/712,839

(22) Filed: Apr. 4, 2022

(65) Prior Publication Data

US 2022/0232123 A1 Jul. 21, 2022

Related U.S. Application Data

(63) Continuation of application No. 17/237,571, filed on Apr. 22, 2021, now Pat. No. 11,349,984, which is a
(Continued)

(51) Int. Cl.
*H04M 7/00* (2006.01)
*H04M 3/42* (2006.01)
*H04M 3/22* (2006.01)

(52) U.S. Cl.
CPC .................................. *H04M 3/2281* (2013.01)

(58) Field of Classification Search
CPC .................................................. H04M 3/2281
(Continued)

(56) References Cited

U.S. PATENT DOCUMENTS 4,611,096 A * 9/1986 Asmuth ............... H04Q 3/0029
379/230
5,528,672 A 6/1996 Wert et al.
(Continued)

FOREIGN PATENT DOCUMENTS

CA 2965681 A1 5/2016
CA 3061385 A1 5/2016
(Continued)

OTHER PUBLICATIONS

PCT/US2015/058401, "International Application Serial No. PCT/US2015/058401 International Search Report and Written Opinion mailed Feb. 17, 2016", SMS/800, Inc., 5 pages.
(Continued)

*Primary Examiner* — William J Deane, Jr.
(74) *Attorney, Agent, or Firm* — GTC LAW GROUP PC & AFFILIATES

(57) ABSTRACT

A system for visualizing call routing data associated with a telecommunications identifier is provided. The system includes a client interface and a parsing tool. The client interface is structured to communicate with a telecommunications management platform having a database that stores call routing data. The parsing tool is associated with the client interface. The parsing tool receives call routing data associated with the telecommunications identifier in response to a query of the database, and the parsing tool generates parsed data by parsing the call routing data. The parsed data is structured to display the call routing data in a tree format on the client interface.

20 Claims, 20 Drawing Sheets

Related U.S. Application Data continuation of application No. 16/536,924, filed on Aug. 9, 2019, now Pat. No. 11,039,007.

(60) Provisional application No. 62/717,541, filed on Aug. 10, 2018.

(58) Field of Classification Search
USPC ............ 379/220.01, 201.01, 221.01, 221.02; 370/352
See application file for complete search history.

(56) References Cited

U.S. PATENT DOCUMENTS

| | | | |
|---|---|---|---|
| 5,586,175 A | 12/1996 | Hogan et al. | |
| 5,950,172 A | 9/1999 | Klingman | |
| 6,115,462 A | 9/2000 | Servi et al. | |
| 6,137,877 A | 10/2000 | Robin et al. | |
| 6,173,279 B1 | 1/2001 | Levin et al. | |
| 6,236,851 B1 | 5/2001 | Fougnies et al. | |
| 6,393,283 B1 | 5/2002 | Morgan | |
| 6,473,500 B1 | 10/2002 | Risafi et al. | |
| 6,574,661 B1 * | 6/2003 | Delano | G06F 11/0709 379/267 |
| 6,654,451 B1 | 11/2003 | Ward et al. | |
| 6,763,376 B1 | 7/2004 | Devine et al. | |
| 6,947,532 B1 | 9/2005 | Marchand et al. | |
| 7,072,454 B1 * | 7/2006 | Ward | H04M 15/90 379/120 |
| 7,092,888 B1 | 8/2006 | Mccarthy et al. | |
| 7,099,453 B2 | 8/2006 | Crockett et al. | |
| 7,225,249 B1 | 5/2007 | Barry et al. | |
| 7,236,954 B1 | 6/2007 | Marchand et al. | |
| 7,298,833 B2 | 11/2007 | Klein et al. | |
| 7,302,250 B2 | 11/2007 | Chin et al. | |
| 7,542,553 B2 | 6/2009 | Gurfein et al. | |
| 7,643,627 B2 | 1/2010 | Starling et al. | |
| 8,090,648 B2 | 1/2012 | Zoldi et al. | |
| 8,379,531 B2 | 2/2013 | Farris et al. | |
| 8,401,161 B2 | 3/2013 | Terpstra et al. | |
| 8,619,961 B2 | 12/2013 | Starling et al. | |
| 8,687,789 B2 | 4/2014 | Marascio et al. | |
| 8,831,205 B1 | 9/2014 | Wu et al. | |
| 8,917,860 B2 | 12/2014 | Duva et al. | |
| 9,531,886 B2 | 12/2016 | Wong et al. | |
| 9,549,066 B2 | 1/2017 | Sharma et al. | |
| 9,553,997 B2 | 1/2017 | Sharma et al. | |
| 9,571,666 B2 | 2/2017 | Sharma | |
| 9,571,667 B2 | 2/2017 | Kimmel | |
| 9,635,191 B2 | 4/2017 | Sharma et al. | |
| 9,654,648 B2 | 5/2017 | Sharma | |
| 9,654,649 B2 | 5/2017 | Sharma | |
| 9,716,799 B2 | 7/2017 | Sharma | |
| 9,800,742 B2 | 10/2017 | Sharma | |
| 9,807,249 B2 | 10/2017 | Aldworth | |
| 9,807,251 B2 | 10/2017 | Sharma et al. | |
| 9,872,156 B2 | 1/2018 | Aldworth | |
| 9,930,189 B2 | 3/2018 | Chauhan | |
| 9,992,352 B2 | 6/2018 | Sharma et al. | |
| 10,097,698 B2 | 10/2018 | Sharma et al. | |
| 10,149,156 B1 | 12/2018 | Tiku et al. | |
| 10,165,128 B2 | 12/2018 | Sharma | |
| 10,306,075 B2 | 5/2019 | Sharma et al. | |
| 10,382,631 B2 | 8/2019 | Sharma et al. | |
| 10,477,033 B2 | 11/2019 | Chauhan | |
| 10,560,583 B2 | 2/2020 | Sharma | |
| 10,674,009 B1 | 6/2020 | Jakobsson | |
| 10,708,443 B2 | 7/2020 | Sharma et al. | |
| 10,742,821 B2 | 8/2020 | Chauhan | |
| 10,778,852 B2 | 9/2020 | Sharma et al. | |
| 10,791,225 B2 | 9/2020 | Sharma | |
| 11,039,007 B2 | 6/2021 | Karnas et al. | |
| 11,039,021 B2 | 6/2021 | Sharma et al. | |
| 11,128,759 B2 | 9/2021 | Aldworth | |
| 11,140,525 B2 | 10/2021 | Aldworth | |
| 11,178,289 B2 | 11/2021 | Sharma et al. | |
| 11,277,524 B2 | 3/2022 | Sharma et al. | |
| 11,349,984 B2 | 5/2022 | Karnas et al. | |
| 2002/0186825 A1 | 12/2002 | Marchand et al. | |
| 2003/0048889 A1 | 3/2003 | Marchead et al. | |
| 2004/0213392 A1 | 10/2004 | Crockett et al. | |
| 2004/0240381 A1 | 12/2004 | Clark et al. | |
| 2005/0058270 A1 | 3/2005 | Allen et al. | |
| 2006/0062364 A1 | 3/2006 | Crockett et al. | |
| 2006/0093112 A1 * | 5/2006 | Book | H04M 15/90 379/114.24 |
| 2006/0115061 A1 | 6/2006 | Wilson et al. | |
| 2006/0121943 A1 | 6/2006 | Zabawskyj et al. | |
| 2008/0162556 A1 | 7/2008 | Mcconnell | |
| 2010/0158201 A1 | 6/2010 | Vijay et al. | |
| 2011/0069661 A1 | 3/2011 | Waytena et al. | |
| 2011/0249666 A1 | 10/2011 | Holbrook et al. | |
| 2012/0030293 A1 | 2/2012 | Bobotek | |
| 2012/0288078 A1 | 11/2012 | Starling et al. | |
| 2013/0070757 A1 * | 3/2013 | Elliott | H04Q 3/0025 370/352 |
| 2013/0094640 A1 | 4/2013 | Mcclure et al. | |
| 2013/0101108 A1 | 4/2013 | Leister et al. | |
| 2013/0151314 A1 | 6/2013 | Kugler et al. | |
| 2013/0177142 A1 | 7/2013 | Allen et al. | |
| 2013/0195102 A1 | 8/2013 | Kyle | |
| 2014/0006218 A1 | 1/2014 | Muthu | |
| 2014/0074685 A1 | 3/2014 | Dufresne | |
| 2014/0307730 A1 | 10/2014 | Friedman et al. | |
| 2014/0337437 A1 | 11/2014 | Peters et al. | |
| 2015/0010012 A1 | 1/2015 | Koponen et al. | |
| 2016/0127539 A1 | 5/2016 | Sharma | |
| 2016/0127540 A1 | 5/2016 | Sharma et al. | |
| 2016/0127541 A1 | 5/2016 | Sharma | |
| 2016/0127548 A1 | 5/2016 | Sharma | |
| 2016/0127549 A1 | 5/2016 | Sharma | |
| 2016/0127552 A1 | 5/2016 | Sharma et al. | |
| 2016/0127562 A1 | 5/2016 | Chauhan | |
| 2016/0127566 A1 | 5/2016 | Sharma et al. | |
| 2016/0127567 A1 | 5/2016 | Kimmel | |
| 2016/0127569 A1 | 5/2016 | Karnas et al. | |
| 2016/0127808 A1 | 5/2016 | Wong et al. | |
| 2016/0191716 A1 | 6/2016 | Sharma | |
| 2016/0360038 A1 * | 12/2016 | Phelps | H04L 5/14 |
| 2017/0064523 A1 | 3/2017 | Aldworth | |
| 2017/0078495 A1 | 3/2017 | Tschirhart | |
| 2017/0085724 A1 | 3/2017 | Sharma et al. | |
| 2017/0094066 A1 | 3/2017 | Sharma et al. | |
| 2017/0180567 A1 | 6/2017 | Sharma et al. | |
| 2018/0020102 A1 | 1/2018 | Aldworth | |
| 2018/0027129 A1 | 1/2018 | Sharma | |
| 2018/0132073 A1 | 5/2018 | Aldworth | |
| 2018/0249016 A1 | 8/2018 | Sharma et al. | |
| 2019/0028595 A1 | 1/2019 | Chauhan | |
| 2019/0089844 A1 | 3/2019 | Sharma et al. | |
| 2019/0312979 A1 | 10/2019 | Sharma | |
| 2020/0021690 A1 | 1/2020 | Sharma et al. | |
| 2020/0028974 A1 | 1/2020 | Chauhan | |
| 2020/0053204 A1 | 2/2020 | Karnas et al. | |
| 2020/0076957 A1 | 3/2020 | Sharma | |
| 2020/0128134 A1 | 4/2020 | Sharma et al. | |
| 2020/0244814 A1 | 7/2020 | Sharma et al. | |
| 2020/0296224 A1 | 9/2020 | Sharma et al. | |
| 2020/0314248 A1 | 10/2020 | Sharma et al. | |
| 2020/0404463 A1 | 12/2020 | Aldworth | |
| 2021/0006946 A1 | 1/2021 | Aldworth | |
| 2021/0021970 A1 | 1/2021 | Aldworth | |
| 2021/0037142 A1 | 2/2021 | Sharma et al. | |
| 2021/0044703 A1 | 2/2021 | Sharma et al. | |
| 2021/0266400 A1 | 8/2021 | Karnas et al. | |
| 2021/0352478 A1 | 11/2021 | Hauser et al. | |
| 2022/0239648 A1 | 7/2022 | Ramachandran et al. | |
| 2022/0360663 A1 | 11/2022 | Kempson et al. | |

FOREIGN PATENT DOCUMENTS

| | | |
|---|---|---|
| CA | 2959916 A1 | 4/2018 |
| CA | 3042814 A1 | 4/2018 |
| CA | 2967451 C | 7/2020 |

(56) References Cited

FOREIGN PATENT DOCUMENTS

| WO | 2000059197 | A1 | 10/2000 |
|---|---|---|---|
| WO | 2016070095 | A1 | 5/2016 |
| WO | 2016090338 | A1 | 6/2016 |
| WO | 2016090338 | A9 | 3/2017 |

OTHER PUBLICATIONS

PCT/US2015/058401, "International Application Serial No. PCT/US2015/058401, International Preliminary Report on Patentability and Written Opinion dated May 11, 2017", Somos, Inc., 7 Pages.
PCT/US2015/064135, "International Application Serial No. PCT/US2015/064135, International Preliminary Report on Patentability and Written Opinion dated Jun. 15, 2017", Somos, Inc., 12 Pages.
PCT/US2015/064135, "International Application Serial No. PCT/US2015/064135, International Search Report and Written Opinion dated Mar. 31, 2016", Somos, Inc., 15 pages.
PCT/US2022/037326, "International Application Serial No. PCT/US2022/037326, Invitation to Pay Additional Fees and, Where Applicable, Protest Fee dated Oct. 11, 2022", Somos, Inc., 2 pages.

\* cited by examiner

TELECOMMUNICATIONS DATA MANAGEMENT INTERFACE

CLAIM TO PRIORITY

This application is a continuation of U.S. patent application Ser. No. 17/237,571 filed Apr. 22, 2021 titled "TELECOMMUNICATIONS DATA MANAGEMENT INTERFACE".

U.S. patent application Ser. No. 17/237,571 is a continuation of U.S. patent application Ser. No. 16/536,924 filed Aug. 9, 2019 titled "TOLL-FREE TELECOMMUNICATIONS DATA MANAGEMENT INTERFACE", now patent Ser. No. 11/039,007 issued on Jun. 15, 2021.

U.S. patent application Ser. No. 16/536,924 which claims the benefit of U.S. Provisional Application 62/717,541 filed Aug. 10, 2018, titled "TOLL-FREE TELECOMMUNICATIONS DATA MANAGEMENT INTERFACE."

Each of the above applications is hereby incorporated by reference in its entirety.

BACKGROUND

Field

The apparatus described herein generally relates to a modernized service, or Toll-Free Data Distribution Hub (DDH) that enables a low-cost solution for distributing toll-free call routing information to network operators and other providers of call routing services, including telecommunications operators, carriers, networks and the like that are operating or providing services within a communications system other than a toll-free telecommunications system.

Description of the Related Art

Historically, toll-free routing data was distributed to Service Control Points (SCPs) that are controlled by SCP Owner/Operators. SCPs are costly to build and maintain, and support an outdated network infrastructure. As a result of these factors, the number of SCP Owner/Operators has diminished, particularly over the past ten years. Toll-free numbers (TFNs) were introduced in the mid-1960s to allow called parties (businesses, primarily) to accept financial responsibility for long distance voice calls. Over the years, TFNs have become part of the corporate identity for many companies in conjunction with their web addresses, logos, and branding. Many value-added services have been developed using TFNs as a primary access method for users (i.e., conference calling) and marketers rely on TFNs to evaluate ad campaigns and track consumer behavior.

In the past 50 years, TFNs have been used to facilitate voice-based communication, and the number of Network Operators receiving a direct feed of authoritative toll-free routing data is swiftly declining due to a combination of the interface being technically outdated and costly. Network Operators are no longer investing in legacy network elements, instead focusing investment on next generation IP-based networks. Furthermore, while most other call routing is getting cheaper, toll-free call routing continues to be costly and Network Operators are looking for ways to reduce these transport costs.

What is therefore needed are systems and methods to enable a cost-effective solution for distributing toll-free call routing information to network operators and other providers of call routing services.

SUMMARY

In accordance with an exemplary and non-limiting embodiment a system for visualizing call routing data associated with a toll-free identifier comprises a client interface adapted to transmit a command to at least one server upon which executes software code providing a toll-free telecommunications management platform the toll-free telecommunication platform being in communication with a database upon which is stored call routing data and a parsing tool associated with the client interface, wherein the parsing tool receives call routing data associated with a toll-free telecommunications number in response to a query of the database and wherein the parsing tool parses the call routing data to display the call routing data associated with the toll-free telecommunications number in tree format on the client interface.

In accordance with an exemplary and non-limiting embodiment, a system for visualizing call routing data associated with a toll-free identifier comprises a client interface adapted to transmit a command selected from an API to at least one server upon which executes software code providing a toll-free telecommunications management platform the toll-free telecommunication platform being in communication with a database upon which is stored call routing data and a parsing tool associated with the client interface, wherein the parsing tool receives call routing data associated with a toll-free telecommunications number in response to a query of the database and wherein the parsing tool is adapted to convert the received call routing data from a proprietary format into a JavaScript Object Notation (JSON) record.

DETAILED DESCRIPTION

Figure 1:
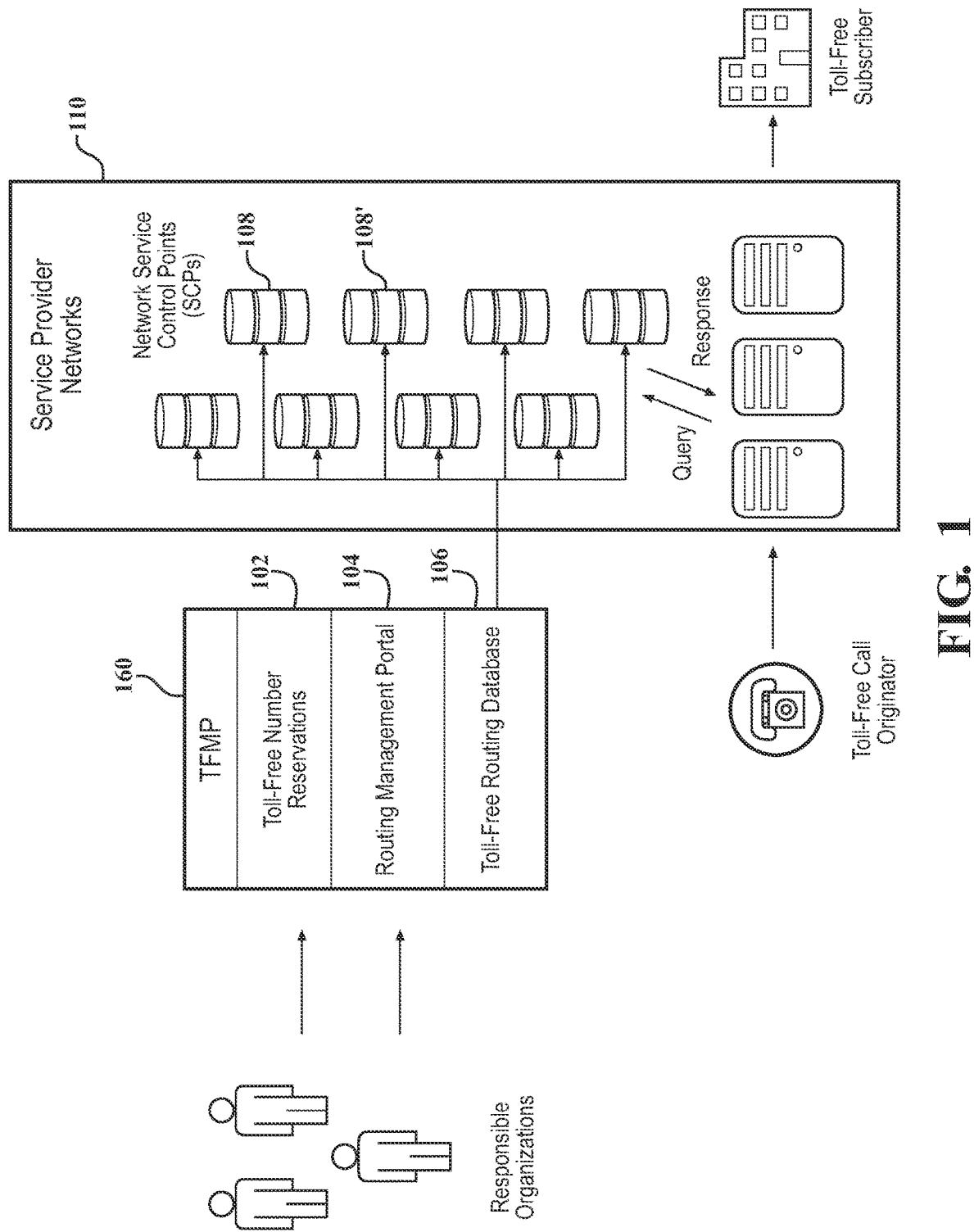
FIG. 1 depicts an illustrative and non-limiting embodiment of the distribution of toll-free routing data from a toll-free management platform (TFMP) to Service Control Points in Service Provider networks.

In accordance with exemplary and non-limiting embodiments, the toll-free management platform, as described herein, may be a distribution point for authoritative network routing information for toll-free phone calls. With reference to FIG. 1, a TFMP 100, comprising a toll-free number reservation module 102, a routing module portal 104 and a toll-free routing database 106 may distribute toll-free routing data to SCPs 108, 108' in one or more Service Provider Network 110 and be associated with a Data Distribution Hub (DDH).

The number of SCP Owner/Operators is dwindling, with only a limited number receiving authoritative toll-free routing information. There are multiple reasons why this number is rapidly decreasing. First, it is difficult to connect to a platform, such as the TFMP, for authoritative toll-free routing data. The connection may be a legacy, proprietary interface. Third party service offerings may be based on an SCP architecture, and many off-the-shelf offerings may be expensive and nearing end-of-life. Furthermore, there are increasingly fewer developers with prior experience with legacy interfaces, and carriers are reluctant to invest in legacy network elements. Not only is it technically difficult to build a SCP to a legacy interface, it is also costly from both a capital and operating expense perspective. Further, once the SCP has been built and certified, there are operating expenses that may include subscription fees, and maintenance and operating costs. Therefore, it doesn't make financial sense for the majority of Network Operators to receive a direct feed of authoritative toll-free routing data. Most rely on Routing as a Service (RaaS) providers who provide a query (or "dip") service to provide toll-free routing information on a per call basis. For most Network Operators the per query cost is cheaper on an annualized basis as compared to the annual SCP operational cost.

Carrier networks are designed to terminate calls using the lowest cost and most efficient route available. However, to do so, the terminating (or receiving) carrier needs to be identified. Databases may not identify the terminating carrier, but instead provide the long distance carrier based on the caller's location. Toll-free numbers usually have at least two routes—the long distance network of the terminating carrier and the long distance network of a partner carrier.

Consider an example of a San Diego-based consumer calling a toll-free number located in Tampa Bay. When the Network Operator in San Diego queries for the toll-free routing information, they will receive information indicating to send it to the long distance network of the terminating carrier. If the terminating carrier does not have a long-distance network in San Diego, the query will tell them to route it to a partner who has a long distance network with access in San Diego. Many of today's Network Operators either do not have long distance access networks or have only built these facilities where it makes the most economic sense. More often, they end up partnering with a Network Operator that can provide ubiquitous long distance access. Resp Orgs, CLECs, and Toll-Free Subscribers must rely on legacy networks to connect to each other. Due to the ubiquitous reach of their networks and their common carriage facilities, an estimated 70% to 80% of all toll-free calls are routed by legacy long distance providers.

Figure 2:
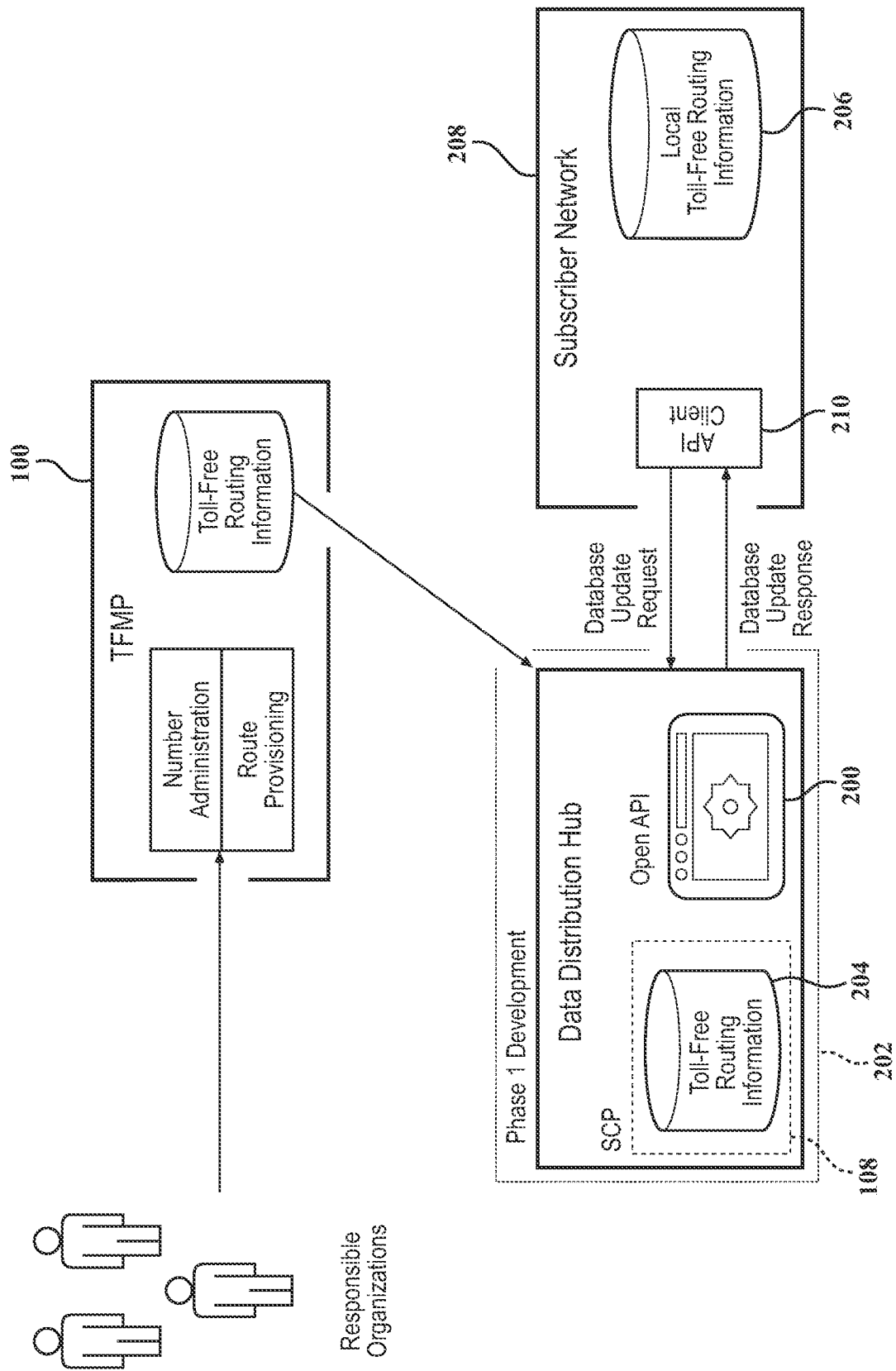
FIG. 2 depicts the high-level architecture of the Data Distribution Hub according to an exemplary and non-limiting embodiment.

With reference to FIG. 2, there is disclosed an exemplary and non-limiting embodiment. As illustrated, a DDH 202 may be comprised of an SCP 108 and a DDH API 200. DDH API 200 may have a mechanism by which a data distribution subscriber may download a complete replica of a toll-free database 204 and store it locally in their subscriber network 208. Once the data is loaded into their local data store 206, they may then utilize a local API client 210 to communicate with the DDH API 200 and pull down data updates in near-real time. The simplicity of the API 200 may reduce the cost of obtaining authoritative toll-free routing data while shortening the implementation period of the API 200 from many months to weeks or even days. A reference code may be provided to help customers build an API client 210 and drive early market adoption.

Figure 3:
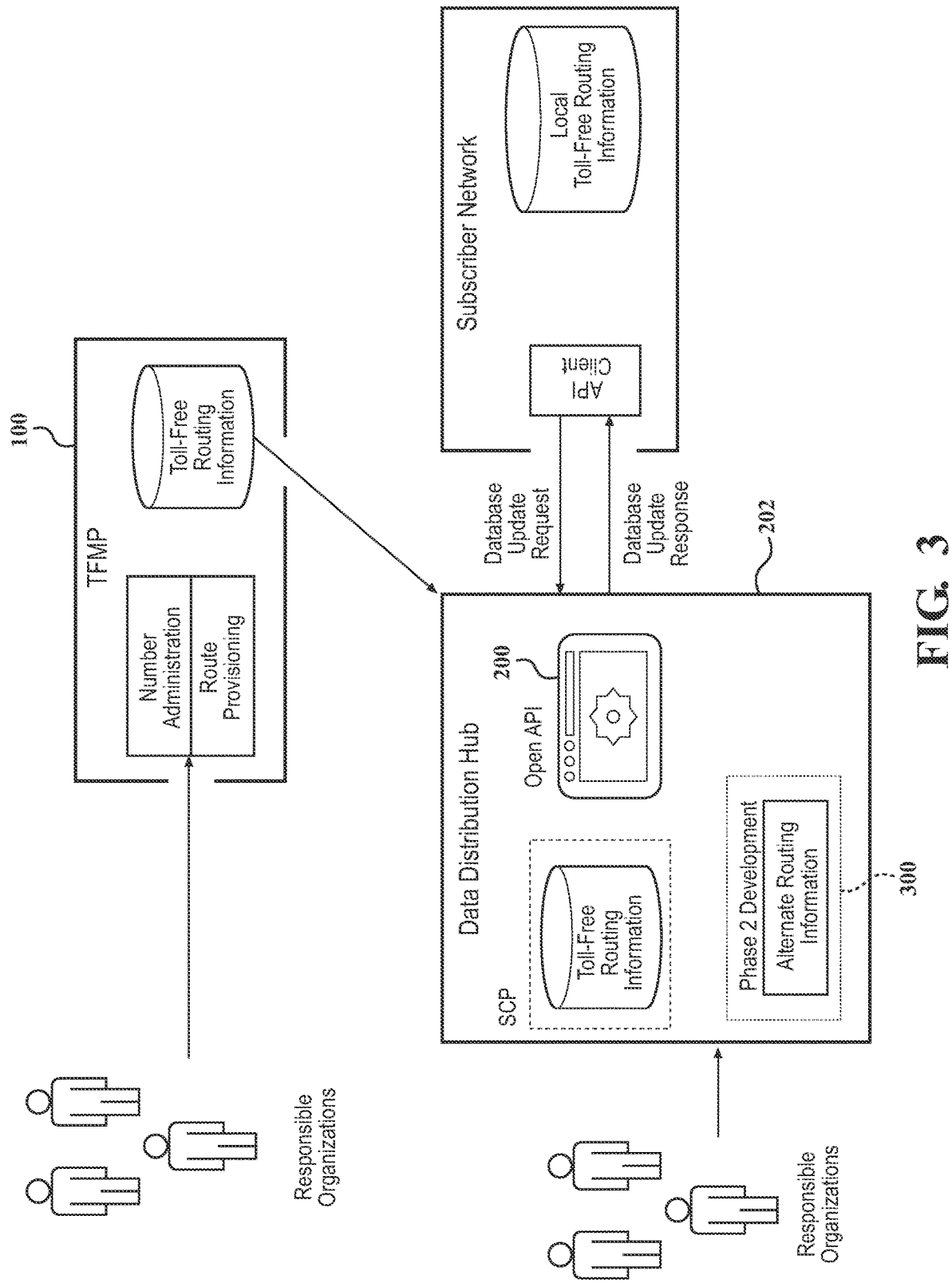
FIG. 3 shows the high-level architecture corresponding to alternate route provisioning according to an exemplary and non-limiting embodiment.

With reference to FIG. 3, there is provided an exemplary and non-limiting embodiment of a DDH adapted to modernize the distribution of toll-free routing information by translating a legacy interface to an open-standards based Application Programming Interface (API). By doing so, the TFMP may provide a toll-free data distribution service to a broader set of Network Operators at a fraction of the cost of owning and operating a SCP, broaden distribution and availability of toll-free data, modernize access to toll-free routing information, make access to toll-free routing information less expensive, help Network Operators reduce the cost of toll-free calls, and provide the technology blueprint for the future of toll-free.

In embodiments, the DDH 202 may be enhanced to include a policy layer 300 for alternate route provisioning, as well as an open-standards API 200 for automated route provisioning. Data Distribution Hub subscribers and Resp Orgs alike may provision alternate routing information, such as an IP route or alternate Carrier Identification Code (CIC), to improve the efficiency and lower costs of routing a call to a TFN.

Responsible Organizations search for, reserve, and assign Toll-Free Numbers in the TFN Registry (TFMP, 100) using the Number Administration function. They also may assign routing data to the TFNs using a Route Provisioning function. That resulting routing data may be sent to the DDH through an SCP. That data may then be sent to a Subscriber over the open API and stored locally. In an alternative embodiment, IP routing may utilize a Fully Qualified Domain Name (FQDN) to identify the IP endpoint for TFNs. That data may be sent to the Data Distribution Hub which may be a distribution mechanism for IP-based routing as an optional data feed for Data Distribution Hub customers.

Having a local copy of an entire toll-free database may have several advantages over using a RaaS provider. Importantly, it can significantly reduce routing charges to toll-free numbers. Since the Resp Org ID is included in the local copy, carriers can often identify the terminating carrier and utilize the least cost route if one is available rather than using the legacy long distance route predetermined by the Resp Org. This can help lower the network cost of routing to toll-free numbers. A local copy of toll-free routing information can also help improve the end-user experience. When a local copy of toll-free routing information resides inside a carrier's network, it significantly reduces call setup latency. By eliminating the need for an external query, or "dip", call setup time is shorter, thus improving end-user satisfaction. Disaster recovery may become less impactful with a local data store. Should an outage occur, the carrier has a local copy that is still usable to route calls until the issue is resolved. Conversely, if a carrier is relying on a RaaS provider and they have an outage, calls are unable to be routed until the issue is resolved or a disaster recovery service is spun up.

Figure 4:
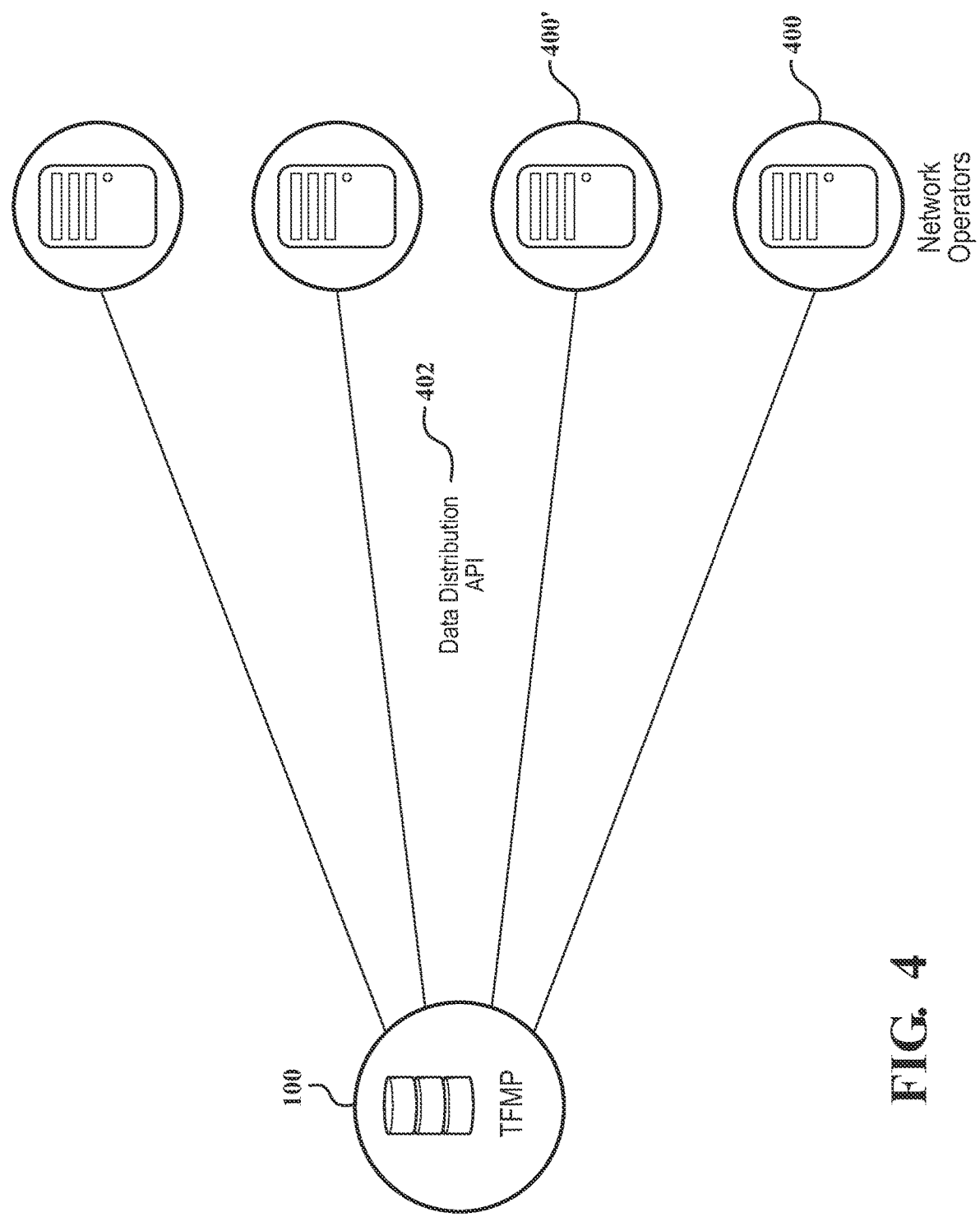
FIG. 4 depicts a distribution channel that includes at least in part network operators and routing-as-a service (RaaS) providers according to an exemplary and non-limiting embodiment.

With regards to FIG. 4, there is illustrated an exemplary and non-limiting embodiment of the DDH channels of distribution that may consist of Network Operators and RaaS providers. Network operators 400, 400' can access the data either directly from the TFMP 100, via Certified Distributors or via Certified Routing Database providers. RaaS providers can only access the data directly from the TFMP and are only permitted to distribute routing information via a query-based service. In an example embodiment, Network Operators 400, 400' may contract directly with the TFMP 100 with a dedicated connection to the DDH API 402. In this setup, the Network Operator 400, 400' may be limited to replicating toll-free routing data within their own network only. There is no resale permitted, nor is a query service permitted.

Figure 5:
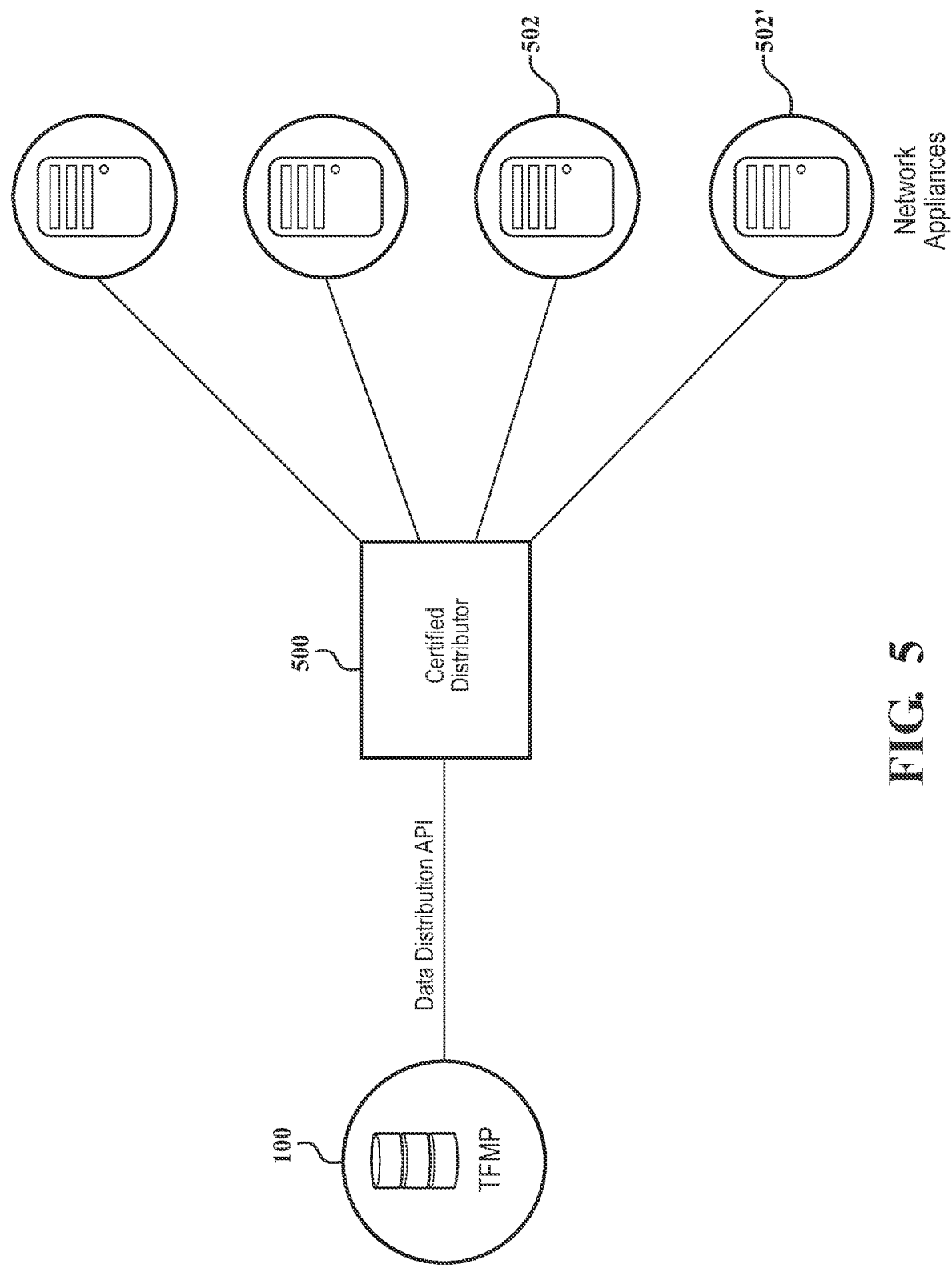
FIG. 5 depicts a certified distributor distribution channel according to an exemplary and non-limiting embodiment.

With regards to FIG. 5, there is illustrated an exemplary and non-limiting embodiment of Network Operators receiving toll-free routing data through Certified Distributors 500. Certified distributors may have a centralized network appliance 500, through which they may distribute the Toll-Free routing data to satellite appliances 502, 502' deployed in the network of the Operators. The Certified Distributor may enter into a reseller licensing agreement with the TFMP 100, allowing them to distribute copies of the toll-free routing database to their customers. The Certified Distributor may be required to provide a revenue share/royalty fee to the TFMP 100 for each connected customer.

Figure 6:
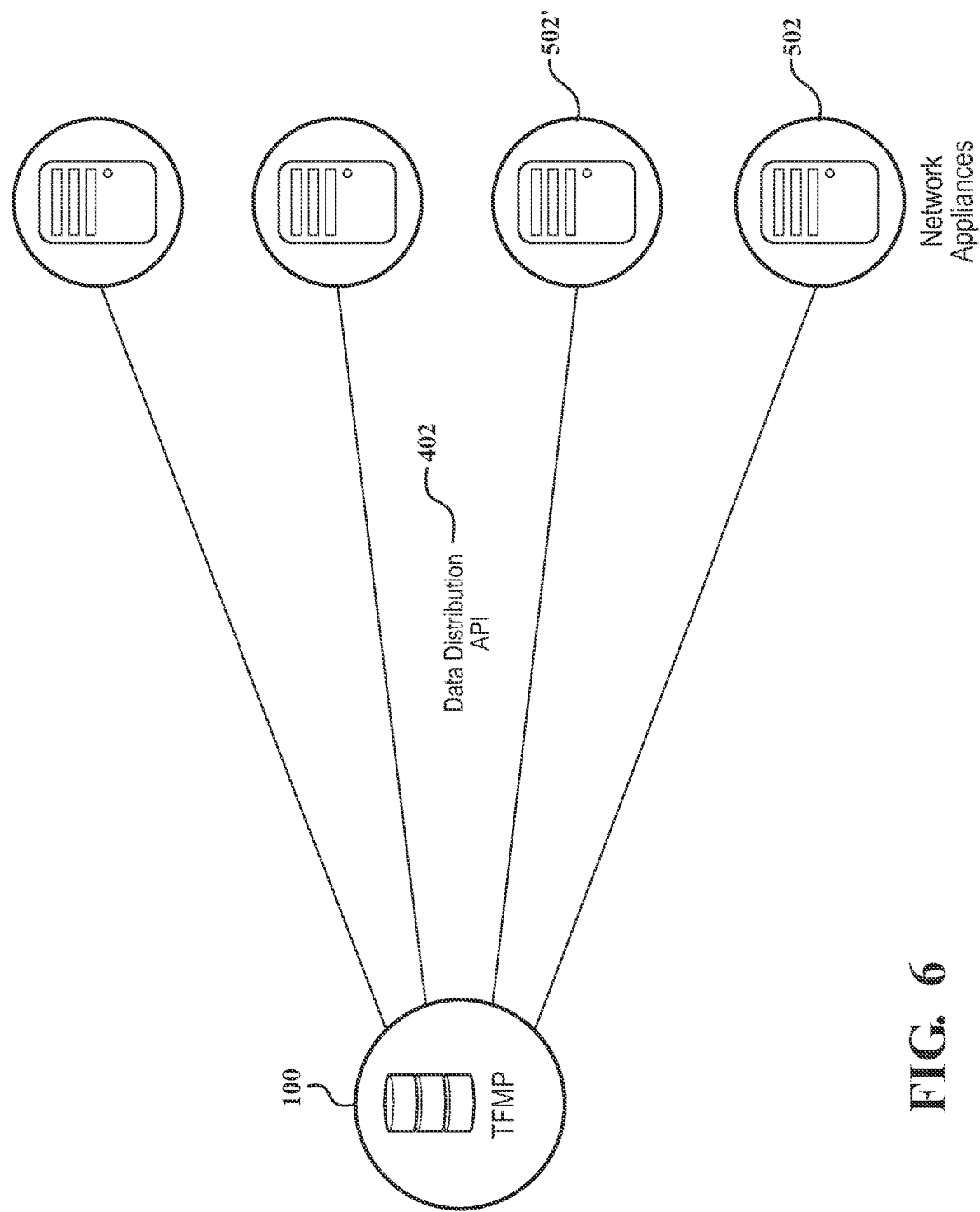
FIG. 6 depicts a distribution channel using a certified routing database according to an exemplary and non-limiting embodiment.

With regards to FIG. 6, there is illustrated an exemplary and non-limiting embodiment of Network Operator access to toll-free routing data via a Certified Routing Database within the TFMP 100. Under this model, the customer may look identical to the direct subscriber, where the customer is using a pre-certified network appliance instead of doing the development work in-house on an existing network appliance. This channel may be similar to the Certified Distributor, except the Network Operator may contract with and be billed by the TFMP. The Routing Database Provider may "certify" their network appliance software with the DDH API 402. The network appliance may then be deployed in the Operator's network and receive updates via a dedicated connection to the Toll-Free DDH API 402.

Figure 7:
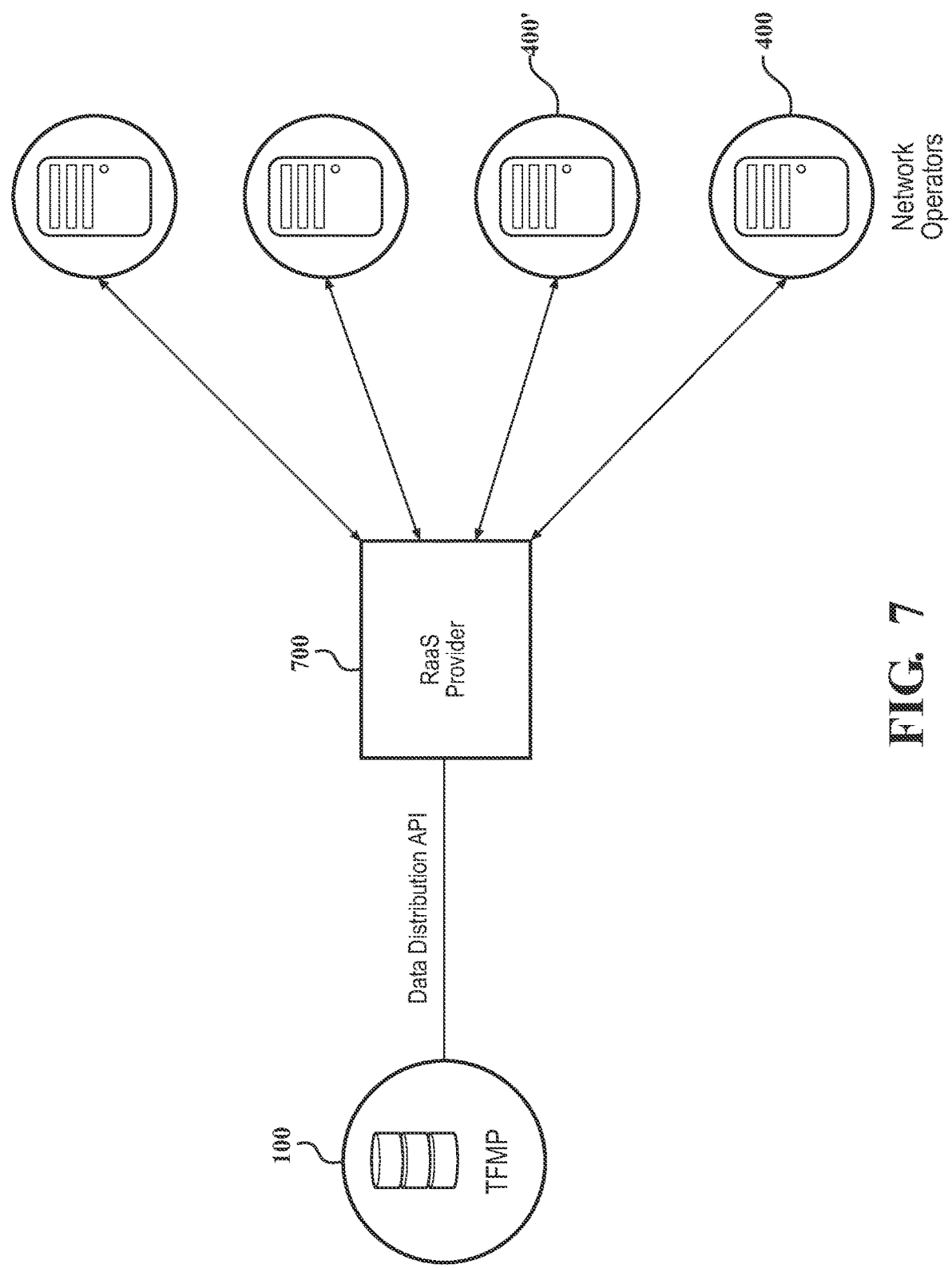
FIG. 7 depicts this distribution channel according to an exemplary and non-limiting embodiment.

With regards to FIG. 7, there is illustrated an exemplary and non-limiting embodiment of an RaaS provider. RaaS providers 700 may offer a query-based, or dip, service to Network Operators 400, 400'. They may serve the majority of Network Operators who do not own and operate a SCP. The RaaS model may be a premium service.

In embodiments, business analytics may also be included as part of the DDH service, including but not limited to providing LCR/peering recommendations based on call record analysis. This may provide intelligence that can be used to scale peering, improve routing, and prevent fraud. The API may also be used for other types of communications data. In an example, currently there is no central source of Caller ID or CNAM data for Toll-Free. By adding this data as a field in either the TFMP and/or the DDH, an authoritative source for toll-free CNAM may be provided. This authoritative data source may help reduce the spoofing of calls from toll-free numbers, and Resp Orgs may update what they want called parties to see when contacted by a toll-free subscriber, possibly including visual information such as logos and other branding elements.

Figure 8:
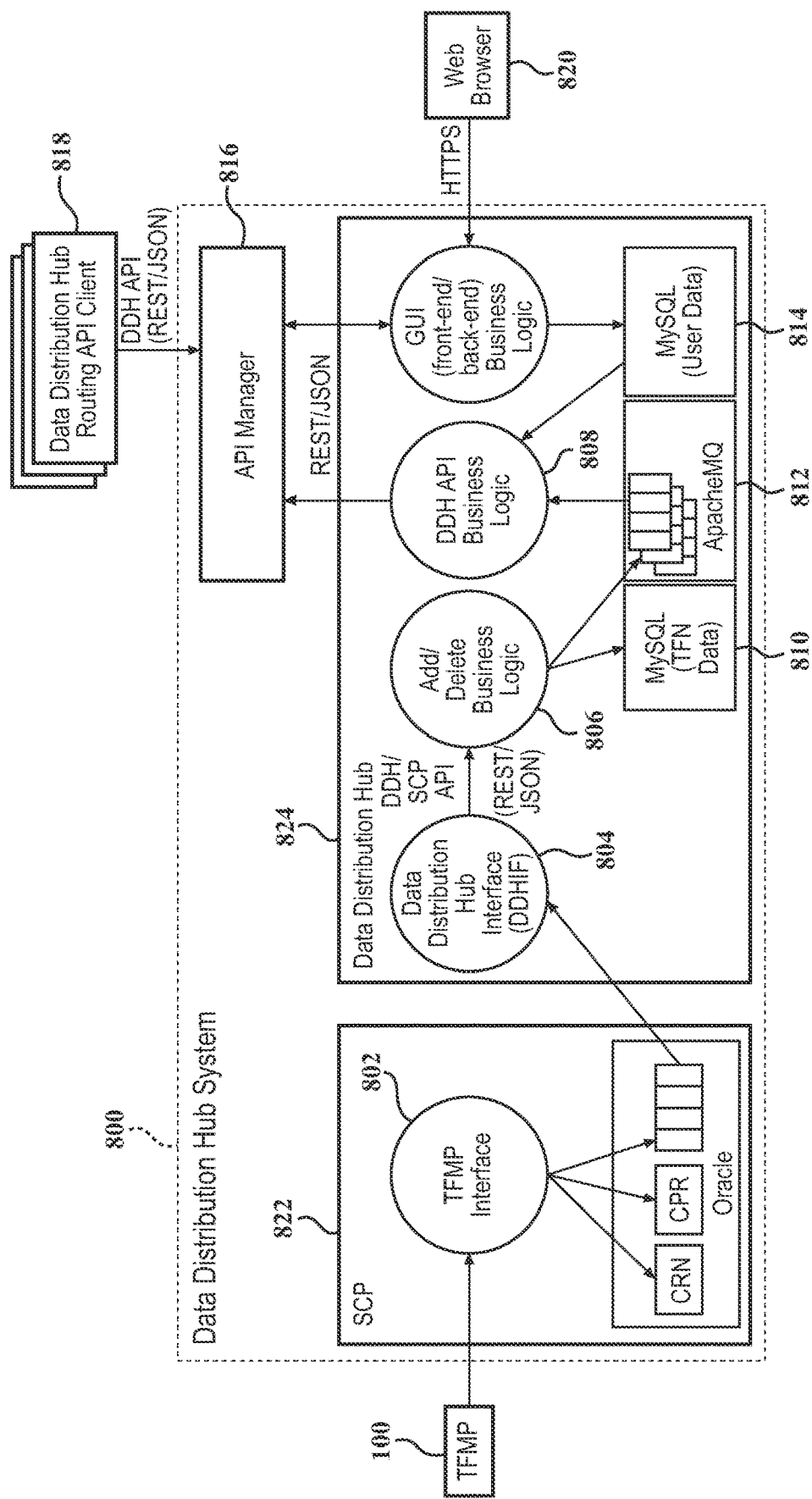
FIG. 8 depicts a sample Data Distribution Hub architecture according to an exemplary and non-limiting embodiment.

With regards to FIG. 8, there is illustrated an exemplary and non-limiting embodiment of a Data Distribution Hub System 800. In embodiments, the Data Distribution Hub 824 may provide toll-free number call routing details to downstream customers 818. As toll-free number information changes, the data may be made available to downstream customers, in chronological order, via a First-In-First-Out (FIFO) queue that a customer accesses and depletes through a DDH API 818. Note that throughout this document the terms toll-free number and call routing number (CRN) are used interchangeably.

In an embodiment, the components of the Data Distribution Hub System 800 may include a Service Control Point (SCP) API Manager 816, Data Distribution Hub 824, ApacheMQ 812, WSO2 (or other open source software, such as broker/message software), Web Browser 820, and the Databases 810. In embodiments, the Data Distribution Hub 800 may incorporate technology that includes, but is not limited to:

Java
  Java is a general-purpose programming language that is class-based, object-oriented and designed to have as few implementation dependencies as possible. Business logic, along with REST APIs, may be implemented using Java.

Spring Framework (JPA, Spring Security, Spring MVC)
  The Spring Framework is an application framework and inversion of control container for the Java platform. Spring Framework also enables a developer to create high performing, reusable, easily testable and loose coupling enterprise Java applications.

Hibernate ORM
  Hibernate ORM is an object-relational mapping tool for the Java programming language. It provides a framework for mapping an object-oriented domain model to a relational database.

MySQL Database
  MySQL is an open source database commonly used for web-based applications.

Oracle Database
  Oracle database (Oracle DB) is a relational database management system (RDBMS). The system is built around a relational database framework in which data objects may be directly accessed by users (or an application front end) through structured query language (SQL). Oracle is a fully scalable relational database architecture and is often used by global enterprises, which manage and process data across wide and local area networks.

REST Based API
  Representational State Transfer (REST) is a software architectural style that defines a set of constraints to be used for creating Web services. Web services that conform to the REST architectural style, called RESTful Web services (RWS), provide interoperability between computer systems on the Internet.

APIGateway for API Traffic, Throttling, Denial of Service, Analytics
  An API gateway is the core of an API management solution. It acts as the single entryway into a system allowing multiple APIs or microservices to act cohesively and provide a uniform experience to the user.

Application Monitoring

Application monitoring is a process that ensures that a software application processes and performs in an expected manner and scope. This technique routinely identifies, measures and evaluates the performance of an application and provides the means to isolate and rectify any abnormalities or shortcomings.

Development Environment & Tools

In software development, the development environment is a set of processes and tools that are used to develop a source code or program. This term is sometimes used synonymously with integrated development environment (IDE), which is the software development tool used to write, build, test and debug a program.

Robot Framework for Test Automation

Robot Framework is a generic test automation framework for acceptance testing and acceptance test-driven development (ATDD). It has easy-to-use tabular test data syntax and it utilizes the keyword-driven testing approach.

Bitbucket Version Control

Bitbucket is a web-based version control repository hosting service owned by Atlassian, for source code and development projects that use either Mercurial or Git revision control systems.

JIRA Agile

Jira is a proprietary issue tracking product developed by Atlassian that allows bug tracking and agile project management.

Sonarqube Code Analysis

SonarQube is an open-source platform developed by SonarSource for continuous inspection of code quality to perform automatic reviews with static analysis of code to detect bugs, code smells, and security vulnerabilities on 20+ programming languages.

Gradle Build Tool

Gradle is an open-source build automation system that builds upon the concepts of Apache Ant and Apache Maven and introduces a Groovy-based domain-specific language instead of the XML form used by Apache Maven for declaring the project configuration.

Jenkins Continuous Integration

Jenkins is an open source automation server written in Java. Jenkins helps to automate the non-human part of the software development process, with continuous integration and facilitating technical aspects of continuous delivery. It is a server-based system that runs in servlet containers such as Apache Tomcat.

Figure 9:
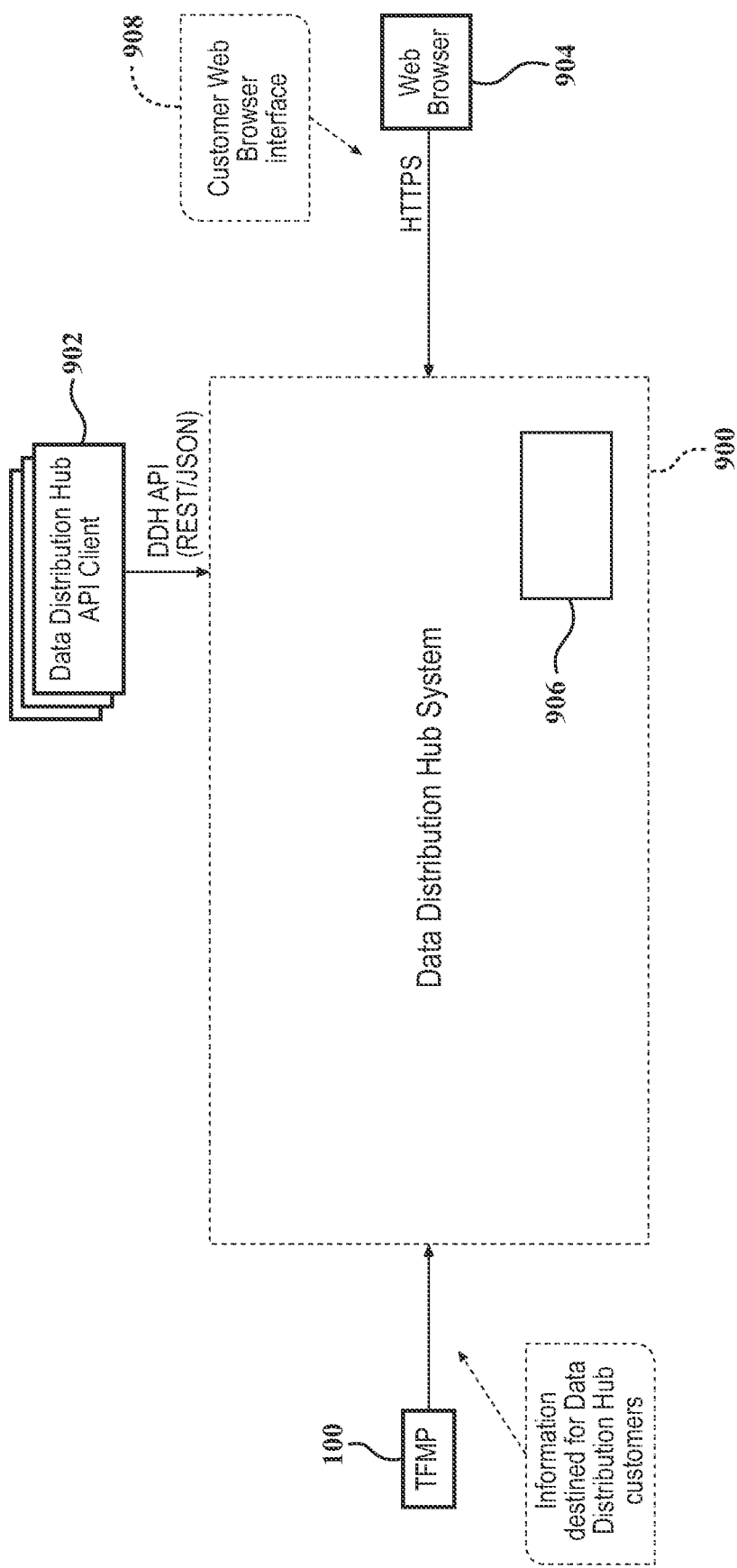
FIG. 9 depicts Data Distribution Hub interfaces according to an exemplary and non-limiting embodiment.

With regards to FIG. 9, there is illustrated an exemplary and non-limiting embodiment of a simplified representation of the Data Distribution Hub System interfaces, placing the SCP and Data Distribution Hub components into a single Data Distribution Hub System 900, and depicting the interfaces into that system. The Data Distribution Hub System 900 may encompass many applications and hardware, including all of the SCP and the Data Distribution Hub. The components surrounding the central box may be external systems that integrate with the system.

The Data Distribution Hub System 900 may collect information from the TFMP, the API Manager 902, and Web Browser Interface 904 and provide the information to "downstream" Data Distribution Hub Customers. The TFMP interface may provide data (e.g., call routing information) to the Data Distribution Hub System 900. The Data Distribution Hub System may be a client of this interface. Using the TFMP interface of the TFMP 100, the Data Distribution Hub System 900 may learn if a toll-free number is active and record the toll-free number's call processing record (CPR) in a database. One message type that may be conveyed on this interface, for the Data Distribution Hub System 900, is the Update Customer Record (UPD-UCR) which provides toll-free number "add/update" and "delete" information for the toll-free number and its CPR.

In embodiments, an API manager 906 may be provided within the Data Distribution Hub System and provide a self-service API, usable by the front-end GUI. The Data Distribution Hub may access the API Manager 906 to provide and retrieve customer information as needed.

In embodiments, a web browser interface 908 may be provided for Data Distribution Hub users and administrators to perform configuration and monitoring tasks that cannot be handled by the Data Distribution Hub API 902. For example, the web browser interface 908 may provide access to user profile information and other data. A web application may be provided, such as an application written using JavaScript. In an example, when a user types the Data Distribution Hub URL into a browser 904, the browser 904 may access the Data Distribution Hub system 900 and download a combination of HTML, CSS, and JavaScript. Subsequent interactions by the user may result in REST based calls to the Data Distribution Hub backend to retrieve data needed to satisfy the customer action.

In embodiments, a Data Distribution Hub API 902 may provide similar information as legacy systems to the downstream Data Distribution Hub customers using REST and JSON. The Data Distribution Hub API 902 may provide messages such as adding, updating, and deleting toll-free numbers, and provide CPR information for each active toll-free number (aka CRN).

Figure 10:
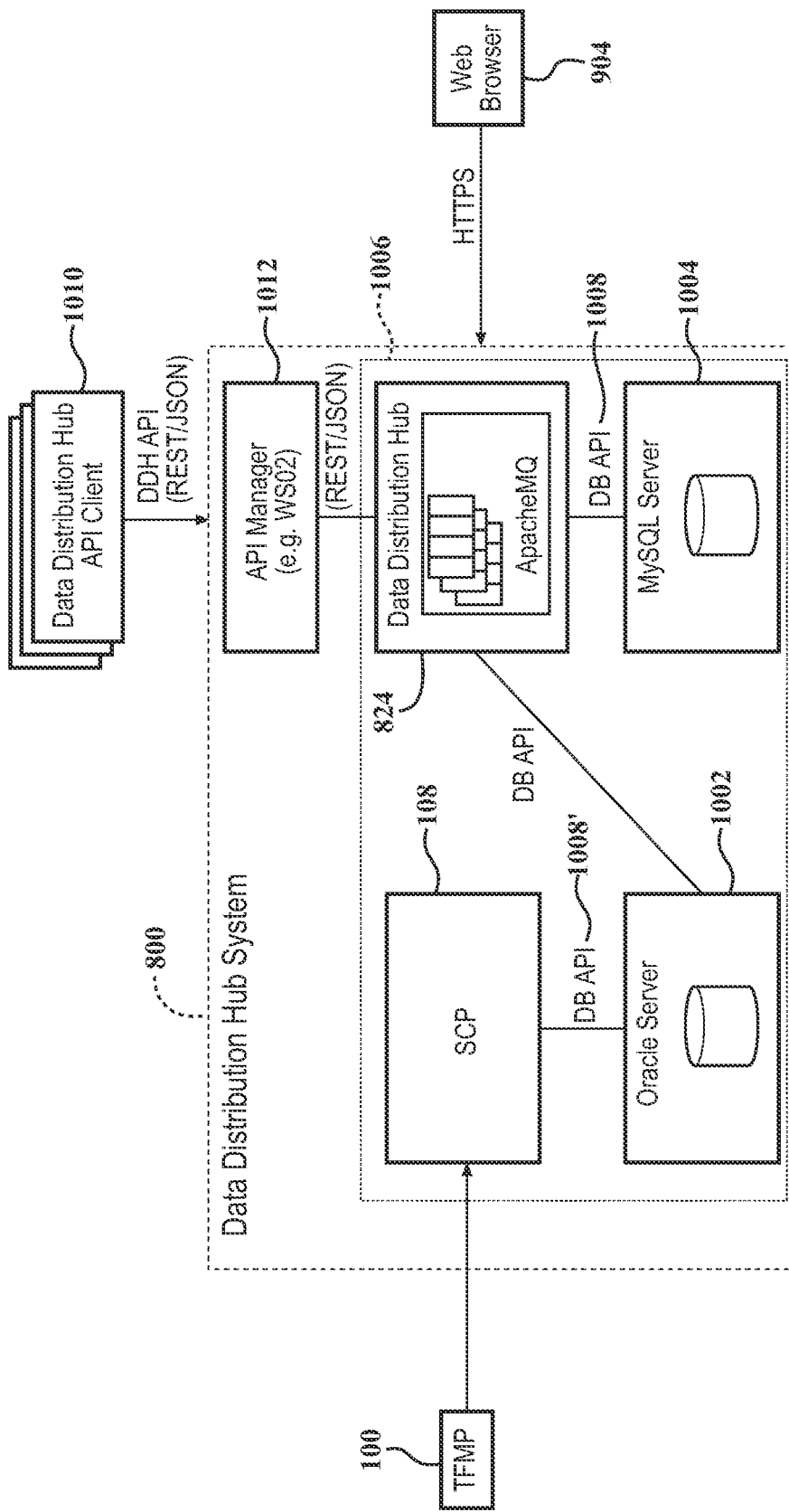
FIG. 10 depicts a sample Data Distribution Hub virtual machine view according to an exemplary and non-limiting embodiment.

With regards to FIG. 10, there is illustrated an exemplary and non-limiting embodiment of a Data Distribution Hub System composed of several virtual machines (VMs). SCPs 108, the Data Distribution Hub 824, and the database servers 1002, 1004 may each be a virtual machine (VM) 1006 in a cloud-deployed solution. High availability (HA) may include redundant VMs. In embodiments, a database server may provide access to a database via a specific database API 1008, 1008'. In an example, Oracle may be used for a SCP. MySQL may be used for the Data Distribution Hub. The pieces of the Data Distribution Hub System 800 may access their respective database servers via configurable IP addresses and ports, so their final location may be flexible. Databases (for example, Oracle and MySQL databases) may be provided on individual, geographically redundant VMs provided by the cloud for HA. Additionally, the architecture may allow for the use of Database as a Service (DBAAS), for example Amazon RDS, as a replacement for running Oracle and MySQL database servers on Data Distribution Hub VMs. As used herein, all references to particular proprietary databases and/or software are in all cases intended as exemplary and non-limiting embodiments.

In embodiments, the SCP host 108 may run on its own VM and communicate with the TFMP interface. A local copy of the downloaded data may be kept in an Oracle database, or some other database type. As toll-free numbers are added, modified, or deleted, events may be saved in a FIFO queue and consumed by the Data Distribution Hub so that it can maintain the state of the toll-free numbers for use by the downstream Data Distribution Hub customers 1010 (via the Data Distribution Hub API). The Data Distribution Hub 824 may receive information from a SCP event queue, an API Manager (REST/JSON) 1012, and Web Browsers 904 using HTTPS for customer configuration. The information (state) may be stored, for example, in a MySQL database on the database server 1004. The messages downloaded by Data Distribution Hub customers may be stored in a single database table in the MySQL database along with an index into that table for each user. This may allow the Data Distribution Hub 824 to save a single copy of data to support any number of users. Each user may maintain a pointer (index) to the last row in the table that they downloaded. As a client consumes messages, the last index read may be updated in the database.

Figure 11:
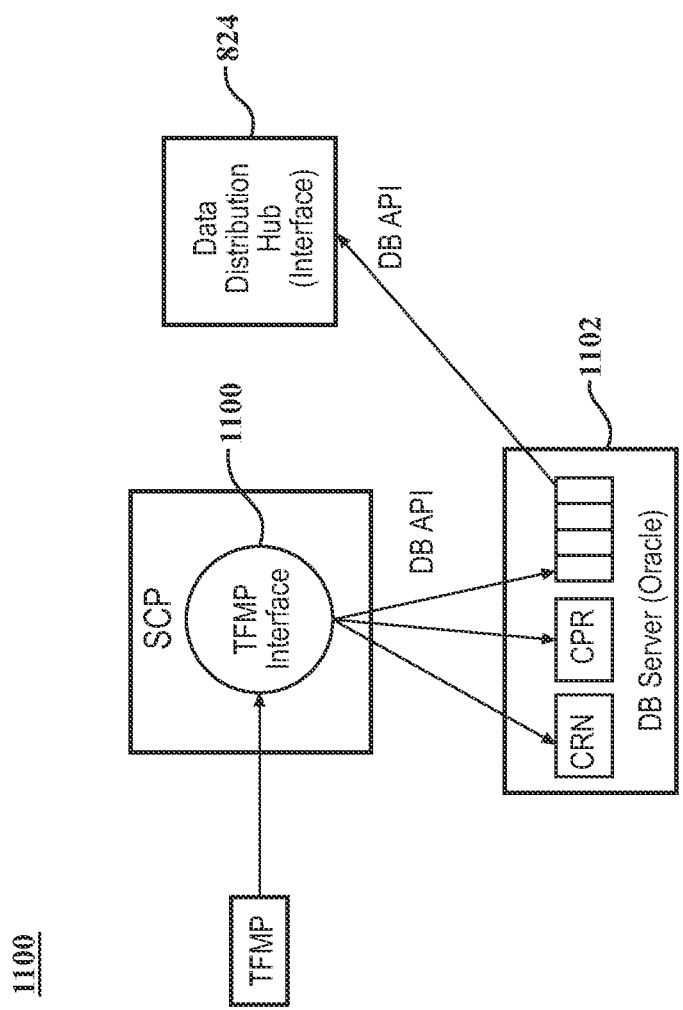
FIG. 11 depicts a sample SCP application architecture according to an exemplary and non-limiting embodiment.

With regards to FIG. 11, there is illustrated an exemplary and non-limiting embodiment of an SCP software architecture. The SCP software architecture 1100, as described herein, may support the TFMP interface 1100. An application on the Data Distribution Hub Server may access an Oracle or other database 1102 to drain an SCP event queue of the SCP, one event at a time, in FIFO order.

FIG. 11 illustrates the logic of how the "events" (new TFNs, deleted TFNs, changes to routing data, etc.) are queued for processing by a SCP to be sent to the DDH. The CRN is the Customer Record Number and is the actual toll-free number. The CPR is the call processing record and contains all of the routing elements for the CRN. In embodiments, the SCP application may communicate with the TFMP following a specification. The application may populate the FIFO queue with the needed information for the Data Distribution Hub 824. FIFO Queues may be used to support communication between SCP and the Data Distribution Hub 824.

A database FIFO queue may contain events destined for the Data Distribution Hub Server. For example, when a TM-STS-000798 UPD-UCR "delete" occurs, this event may be communicated between a SCP and Data Distribution Hub via this queue. In some embodiments, the queue may be processed in the DDH database. As requests are processed, the results may be added to the SCP FIFO queue by the TFMP Interface application. The Data Distribution Hub 824 may then read from the FIFO queue. The event may be removed from the FIFO queue when the Data Distribution Hub has confirmed receipt and storage of the event, one event at a time. This queue may be necessary when the Data Distribution Hub is down, in that it may allow the TFMP Interface to acknowledge the UDP-UCR events (and other events) arriving and still queue the events for later transmission to the Data Distribution Hub once it is running again.

Figure 12:
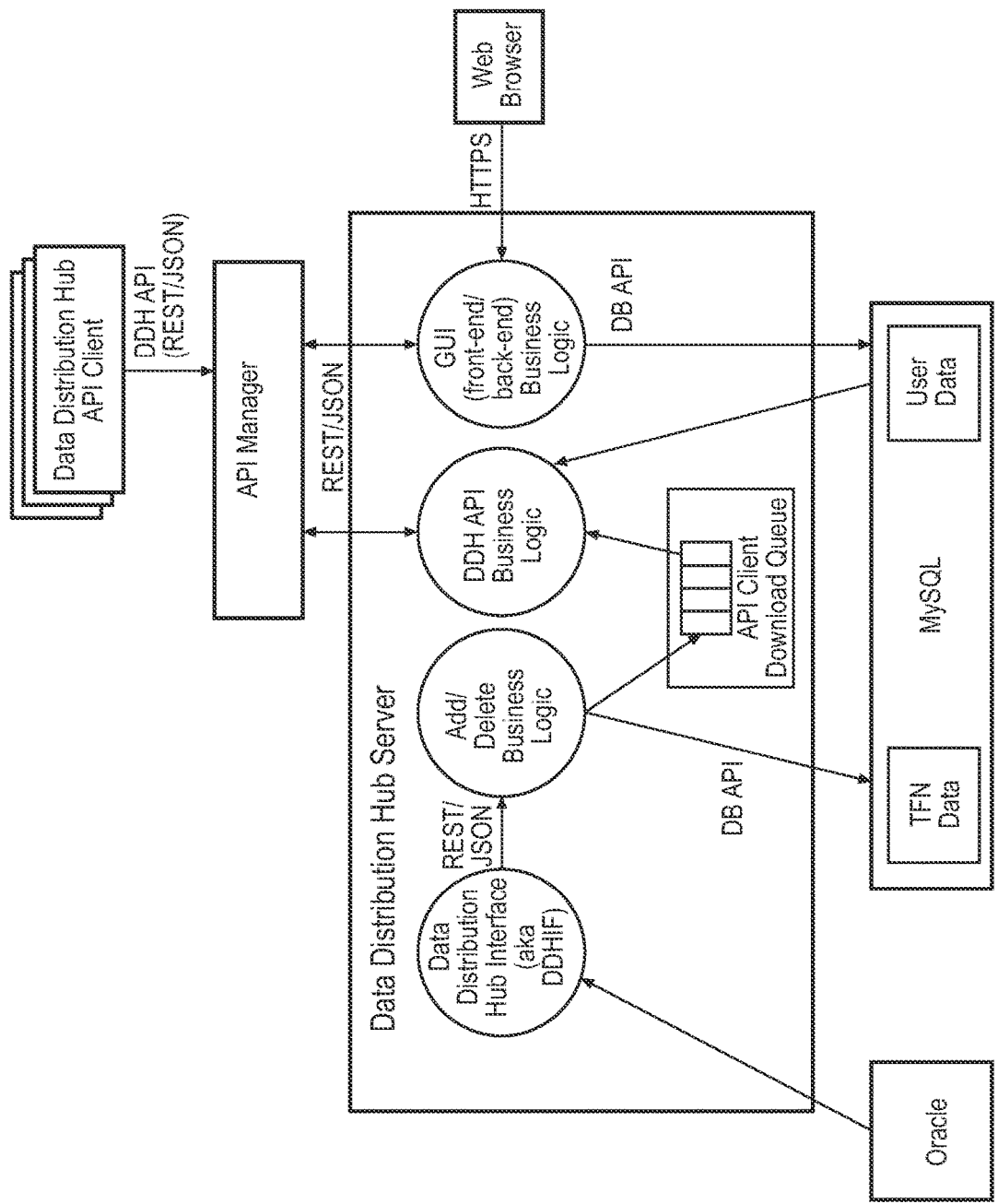
FIG. 12 depicts a sample Data Distribution Hub software architecture according to an exemplary and non-limiting embodiment.

With regards to FIG. 12, there is illustrated an exemplary and non-limiting embodiment of the major software components of the Data Distribution Hub Server, including the software that communicates with a SCP, the API Manager, Web Browsers, and Data Distribution Hub customers via the Data Distribution Hub API.

As described, the DDH is inclusive of the business logic and components. The DDH Interface is the mechanism used to ingest the data from the Oracle database of the SCP data. The Data Distribution Hub may use an Apache Web Server and Spring/MVC and wait for HTTP requests to act upon.

In embodiments, a Data Distribution Hub Interface may run in Java and exchange information with the Data Distribution Hub "add/delete business logic" regarding the state of toll-free numbers (including their CPRs). The Data Distribution Hub Interface may act as a client for queued events and periodically wake up (configurable in seconds) and inspect, for example, the Oracle FIFO queue. When there are events in the queue, the Data Distribution Hub Interface may send REST/JSON messages (such as an "add toll-free number") to the Data Distribution Hub "add/delete business logic", which is acting as the REST/JSON server. The Data Distribution Hub add/delete business logic may save the data (for example, in its MySQL database as well as in the API download queue) and send back a REST confirmation to the Data Distribution Hub Interface when its work is completed. In embodiments, the Data Distribution Hub Interface may not remove any data from the Oracle FIFO queue until the Data Distribution Hub add/delete business logic has confirmed that the event was successfully processed. If the message to the Data Distribution Hub add/delete business logic was not successfully processed, a failure reply may occur or no reply at all may be generated. In failure cases, the Data Distribution Hub Interface may leave the event in the Oracle FIFO queue and retry sending the event later. When a failure occurs, the Data Distribution Hub Interface may return to its "sleeping" mode and wait for the next cycle to try again and keep trying and sleeping until it is successful. Once successful, the event may be removed from the Oracle FIFO queue and the Data Distribution Hub Interface may move to the next event. Each event may be processed completely, in order, to maintain the integrity of the MySQL database on the Data Distribution Hub host. Therefore, the Data Distribution Hub Interface may not continue (or skip events) when a failure occurs. The entire Oracle FIFO queue may be blocked until the failed event is successful. In embodiments, GUI business logic may store Data Distribution Hub customer information in a database, in the API Manager, and may support health, status, user profile, or maintenance logic.

In embodiments, the Data Distribution Hub add/delete business logic may process TM-STS-000798-related events received from the Data Distribution Hub interface (such as toll-free number "add" and "delete"). The events may ultimately result in queuing of information to be sent to Data Distribution Hub customers over the Data Distribution Hub Routing API. This component may use the MySQL database to save the state associated with the toll-free numbers and use the MySQL database to store the resulting events in a single FIFO that is consumed independently for each downstream Data Distribution Hub API client.

In embodiments, Data Distribution Hub API business logic may access and transmit the FIFO queued events that resulted from the Data Distribution Hub business logic, as described herein, and read messages stored in the database table FIFO. The FIFO may reflect the results from the Data Distribution Hub add/delete business logic (e.g., information from SCP about toll-free numbers). The events may be read in order and provided to downstream Data Distribution Hub customers.

In embodiments, the Data Distribution Hub Routing API FIFO queue may have a producer (Data Distribution Hub add/delete business logic) and a consumer (Data Distribution Hub download business logic). A single queue may exist for API clients along with an index into the queue for each user. The queue may contain the events, in order, to be consumed by the Data Distribution Hub Customer. The events may be added (and updated) and deleted, among other potential events. As the add/delete requests are processed from a SCP's FIFO queue, the results may be sent to an API client when the client issues an HTTP GET request to the Data Distribution Hub download URL. Then, the download business logic may read events from the FIFO queue and provide the add/delete events to the associated downstream Data Distribution Hub customer. The "last message read" index may then be updated in the MySQL database for the specific API client.

In embodiments, an asynchronous process may run to remove messages that are older than a configurable date. This may prevent the database table/FIFO from growing too large and affecting performance. In an example, up to 45 days' worth of data (based on an expected load of 57,000 message a day) may be stored in a database table.

In embodiments, the Data Distribution Hub may use MySQL, or some other format, for storage of user and toll-free number data used by the applications. The MySQL database may provide a server, listening on a well-known port for incoming database clients. This may allow the server to be placed on any host to accommodate the HA architecture.

In embodiments, a front-end web application of the Data Distribution Hub may consist of CSS, HTML, and JavaScript. The web front end may be static content that includes JavaScript that runs in a client browser to perform REST based calls to the Data Distribution Hub back-end application. When a user accesses the login URL of the web front end, the user may be presented with an initial screen that allows the user to login or to sign up as a new customer. When a user attempts to login, they may be required to enter a username and password into fields on the screen and hit a login button. When the user presses the button, JavaScript logic embedded with the web page may capture the values from the username and password fields (as well as any additional fields included in the design) and pass them to the Data Distribution Hub using a "login" web service. If the user is successfully authenticated by the Data Distribution Hub, a web token may be returned to the web browser and the JavaScript logic may transition to the user profile page or any one of the "secured" screens that exist as part of the web application. When a new user attempts to sign up, they may be required to create a username and password and enter any relevant information required by this application. When the user presses the sign-up button (e.g., an actionable link), JavaScript logic embedded with the web page may capture the values and pass them to the Data Distribution Hub using a "sign up" web service. If the user is successfully added, a web token may be returned to the web browser and the JavaScript logic may transition to the user profile page or any one of the "secured" screens that exist as part of the web application like the login flow.

In embodiments, when a user successfully logs in to the Data Distribution Hub, they may be presented a token. Once the web browser has the token, it may be authorized to access any of the secured pages of the web application by providing the token in subsequent REST calls to the Data Distribution Hub. If a valid token is provided to any Data Distribution Hub server, the Data Distribution Hub server may process the REST call from the browser. This behavior may be sufficient to satisfy the requirements that the Data Distribution Hub application is stateless and allows for flexibility in the HA architecture. A token may be created as a JSON Web Token (JWT), an industry standard mechanism for token creation. The token may consist of a series of tags created by the Data Distribution Hub application that are used to encode information to uniquely identify the user and any other data that the application may require to operate. The tags may be hashed and signed with a secret known only to the Data Distribution Hub. This may protect against a user creating their own tokens and masquerading as another user. In addition, an expiration field may be embedded in the token to expire the token.

In embodiments, a High Availability architecture may be associated with the Data Distribution Hub and may include a primary site as well as a disaster recovery site. This may include regionally redundant VMs provided by a cloud service for a SCP and the Data Distribution Hub. This redundancy may allow for both HA and upgrades (to minimize downtime to achieve the 99.99% uptime requirement during upgrade). As an example, the Data Distribution Hub may be deployed using Amazon Web Services including EC2 and MySQL and Oracle RDS in a multi-AZ configuration. The Disaster recovery systems may run in a separate region as the primary systems.

In embodiments, the Data Distribution Hub Routing API may provide an efficient "audit" of toll-free number data. An audit may be forced by the Data Distribution Hub after a failover (or outage), if desired, for any customer, or it may come as part of the Data Distribution Hub Routing API. The audit may use message digests against the expected data to determine the accuracy of the Data Distribution Hub customer's local data store. The audit may use, for example, a recursive 10-prong-tree (a branch for each digit, '0' . . . '9') and message digests to identify and correct invalid toll-free number data.

In embodiments, VMs may run the Data Distribution Hub download business logic and access the customer API download queue in a MySQL database. These VMs may be deployed in an auto-scaling pool configuration, such as that provided by Amazon Web Services. As an example, a performance and scalability solution of the Data Distribution Hub may be:
1. Many VMs may be deployed, each able to perform the Data Distribution Hub download business logic.
    a. Each of these VMs may have an Apache web server ready to service the well-known Data Distribution Hub Routing API Port for inbound REST/JSON messages.
2. The Data Distribution Hub Routing API load may be balanced across the set of VMs.
3. Data may be stored in a centralized database that may be accessed by any Data Distribution Hub server.
4. Since the Data Distribution Hub Routing API is stateless, the Data Distribution Hub download business logic running on any VM may access the database to retrieve Data Distribution Hub customer metadata, including the location (IP address/port) of any FIFO queue.

In summary, performance and scalability may be achieved via a stateless architecture that uses identical VMs as more customers sign up for the service. Each VM "type" may be generic to allow any number of them to be quickly brought online in a cloud environment. Automated scaling may also be applied to enable self-scaling: including dynamically adding and removing VMs based on offered load.

Figure 13:
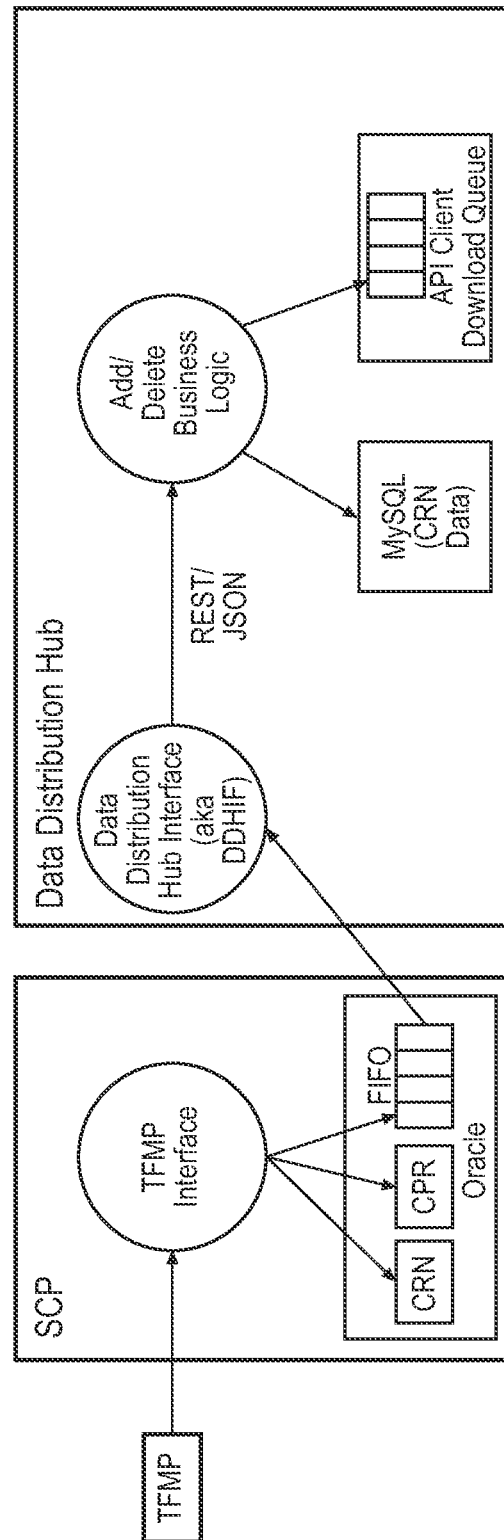
FIG. 13 depicts a sample SCP and Data Distribution Hub interface interaction according to an exemplary and non-limiting embodiment.

FIG. 13 shows possible generalized interactions between the SCP and the Data Distribution Hub Interface. As illustrated, TFMP pushes data changes "events" to SCP over a proprietary SCP interface (e.g., TM-STS-000798). The events are processed in a FIFO basis and sent to the DDH via the DDH Interface, which is then converted through the internal business logic to update the "master" MySQL CRN database and create a download queue that is unique to each subscriber.

Figure 14:
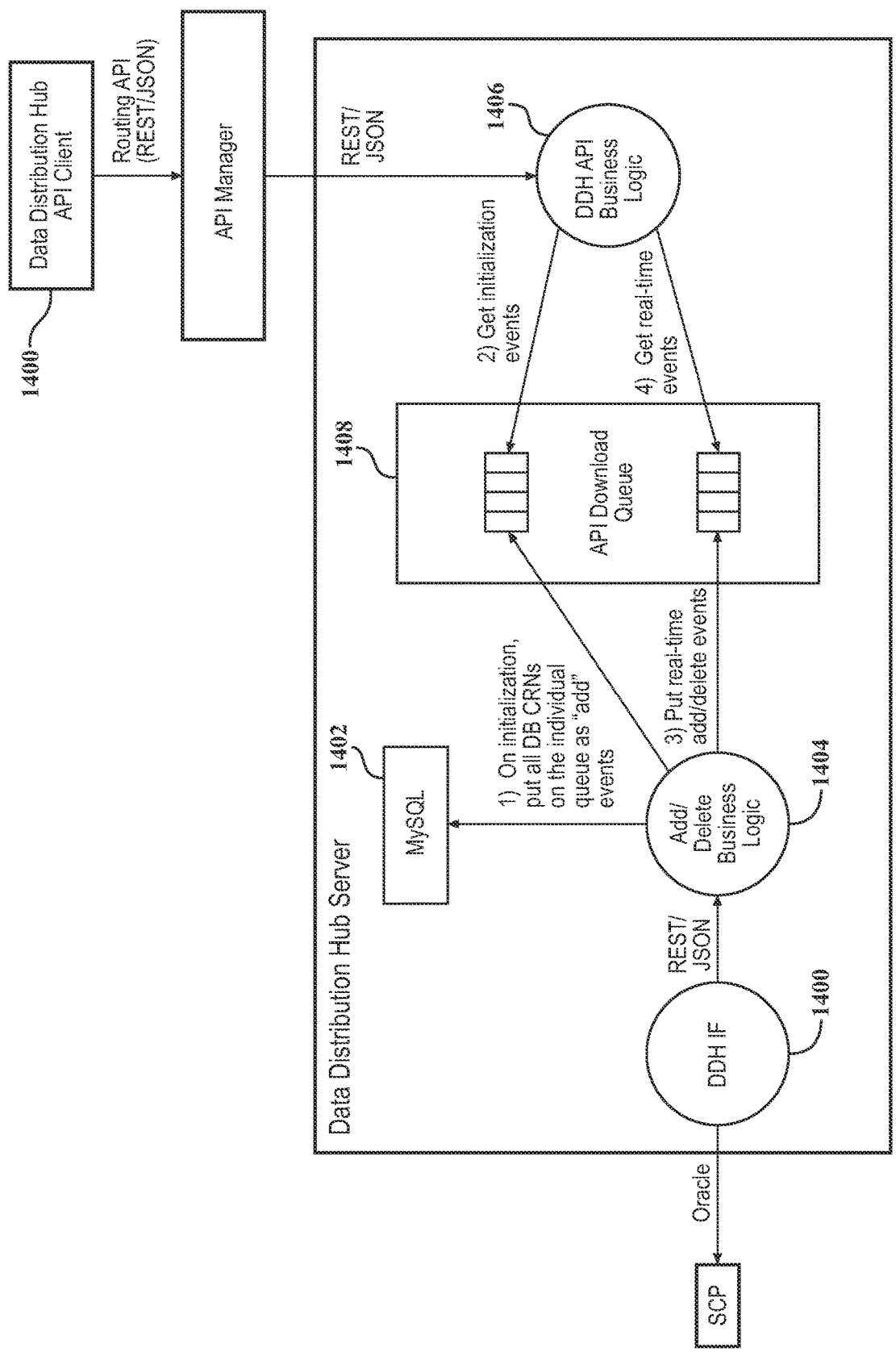
FIG. 14 depicts a Data Distribution Hub server according to an exemplary and non-limiting embodiment.
Figure 15:
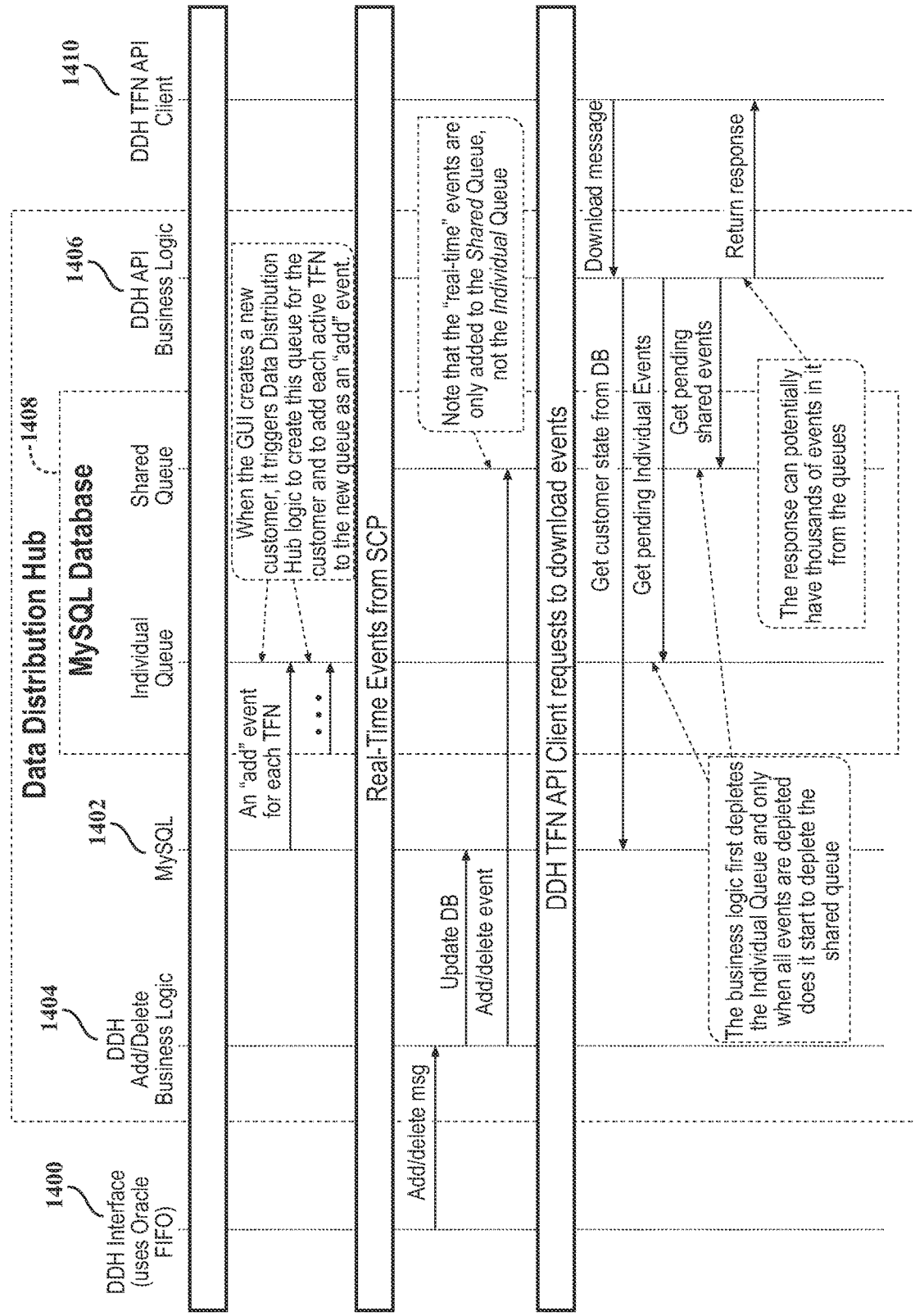
FIG. 15 depicts a sample Data Distribution Hub process flow according to an exemplary and non-limiting embodiment.

With regards to FIGS. 14-15, there is illustrated an exemplary and non-limiting embodiment of a the Data Distribution Hub Interface application. The Data Distribution Hub Interface application 1400 may be a REST/JSON client doing the following: It may periodically wake up (e.g., configurable in seconds, defaulting to one minute) and check for events in the Oracle FIFO queue using the DDH Interface 1400. When the Data Distribution Hub Interface reads an "add" or "update" event from the SCP FIFO queue, it may translate them both to an "add" event for the JSON to send to the Data Distribution Hub. In an example, the Data Distribution Hub may not distinguish a UPD-UCR from an Update Resp. Org (UPD-ROR) since they both show up as "add" events. An "add" event may also mean "replace if it already exists". The reason a UPD-UCR and UPD-RORs may be treated the same is for simplicity of the downstream interfaces (both for the Data Distribution Hub server components in the DDH box and the Data Distribution Hub clients 1400). When the Data Distribution Hub Interface reads an "add" (or "update") event from the queue, it may find the associated CPR hash for the toll-free number (CRN) from the CRN table (Event 1). This hash may be sent as part of the "add" event to the Data Distribution Hub server (Event 2) In an example, only the hash may be sent, and not the CPR. When the Data Distribution Hub Interface reads a "delete" event from the queue, it may send the event to the Data Distribution Hub (Event 3) (there may be no need for a CPR hash in the "delete" case). When a successful response is received from the Data Distribution Hub server, the event may be removed from the queue. If a failure response (or no response) occurs, then the event may remain in the queue to be retransmitted when the Data Distribution Hub Interface tries again. In the Data Distribution Hub add/delete business logic, when it receives the "add" and "delete" events from the SCP, the business logic may perform the following: 1) It may add the events to the API download shared queue 1408 and 2) the MySQL tables 1402 may be updated to reflect the event. This database may mirror the SCP database. After the updates are committed (to the shared queue and DB) a successful response may be returned to the Data Distribution Hub Interface.

In embodiments, when the Data Distribution Hub add/delete business logic receives the "add" event from SCP, the hash may not be in the CPR table yet (on the first occurrence of the hash). When this happens, the Data Distribution Hub server may reply by rejecting the add and asking for the CPR to be included when the add event is resent. When the Data Distribution Hub Interface receives the rejection, it may query the CPR from its CPR table and post a new "add" with both the hash and CPR. Since the CPR contains binary (non-printable) data, it may be encoded in, for example, base64 before it is transmitted within JSON. The Data Distribution Hub may also send a failure indication to Data Distribution Hub Interface to indicate a problem.

Tables associated with storage of CRNs and CPRs in a database may be stored on the Data Distribution Hub (in addition to the SCP to avoid a dependency on the SCP Oracle database, and to allow quick audits, and ease of new customer queue initialization. This may also allow SCP to be removed if a new interface is provided to the TFMP that the Data Distribution Hub can directly connect to.

In embodiments, information may be collected and stored that is related to tracking users (API Clients) that utilize the Data Distribution Hub service. The Data Distribution Hub may implement the pattern of a company, wherein multiple users may exist. Each user may be associated with an API client application and may be required to pass certification before the user will be able to access the production environment. To track company information, the Data Distribution Hub may implement a company database table. The Data Distribution Hub may also implement a user table. Each row in the company table may define a unique company and each user in the user table may contain a foreign key to exactly one row in the company table. Multiple users may map to a single company. A user status table may also exist that tracks information for a single user such as certification status and last audit/download time. Each row in the user status table may contain a foreign key to one row in the user table.

In embodiments, each Data Distribution Hub customer (aka client) may have a series of events to be downloaded that are identical events for all clients. Exceptions can be for queue initialization and CRN updates that result from an audit. Queues may be used to satisfy the clients' needs. While the Data Distribution Hub server may be using more than one queue, the client is unaware since the queues may be hidden from the client behind a single "logical" concept managed by the Data Distribution Hub API Business Logic. This means that as far as the client is concerned, events are being downloaded without any queue concept being required for the client to understand. FIG. 14 depicts this process for a single customer/client's sandbox or live data.

In embodiments of the present disclosure, the Data Distribution Hub may present data contained in the Call Processing Record (CPR) to users, such as subscribers, allowing such users to parse and interpret the CPR so that the routing data provided is more easily integrated within their telecommunication systems. The parsed and interpreted data can then be easily displayed in order to visually comprehend call routing information for a toll-free number. Parsing and interpreting involves resolving data from a proprietary binary format to an open standard showing call routing information for the toll-free number in a tree format, as further described below. This provides customers with CPRs in a format that is more digestible and consistent with current protocols.

In accordance with the foregoing, in embodiments, call routing information is commonly stored in a binary proprietary format called TM-STS-000798 format (also "798 format"). However, this format is more difficult to interpret and display, but by parsing and interpreting the 798 format to another format, for example the JSON format, call routing information is easily be presented on a display in a visual format for review by a user. The Data Distribution Hub may include an API feed that delivers call routing information in a CPR in the JSON tree format. In embodiments, the Data Distribution Hub's API includes functionality for transforming the CPRs received from STAR (Service Translation Advanced Routing) in any proprietary format, such as the 798 format, to a nonproprietary format, such as the JSON tree format, and will persist the nonproprietary format in a database. The transformed CPR in JSON format may then be distributed to Data Distribution Hub customers using the Data Distribution Hub API. The Data Distribution Hub may also include a parsing tool. The parsing tool may be in the user interface that allows a customer to input a TFN, and the CPR visualization may then provide a routing tree depicting the possible paths. The tool allows a user to specify specific branches based either on point and click or by inserting specific routing resolution criteria, as described below. This tool may be used to help new customers understand the data and output.

As described, in embodiments, the Data Distribution Hub application may include an API interface for downstream customers to implement. Data Distribution Hub customers may integrate CPRs with this new API. In using the API, a CPR may be treated as a JSON structure instead of as a 798 binary object. In embodiments, a JSON CPR Tree(s) may be stored in a database (in addition to the binary format). By storing the CPR as JSON, users may more easily perform data analytics on the CPRs stored in the database.

Figure 16:
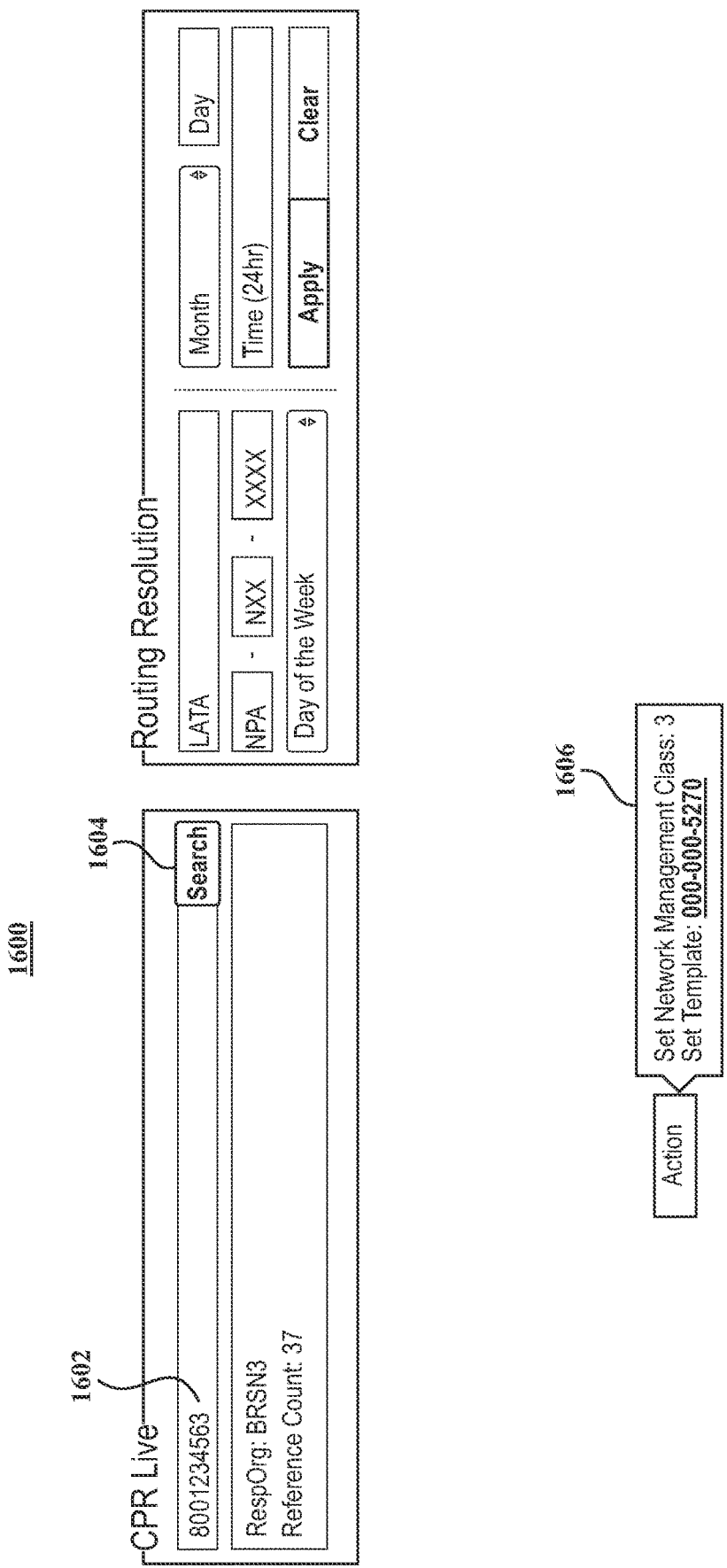
FIGS. 16-20 depict sample call processing record (CPR) Viewer interfaces according to exemplary and non-limiting embodiments.
Figure 17:
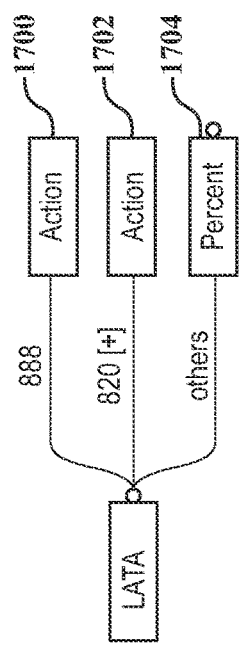
Figure 18:
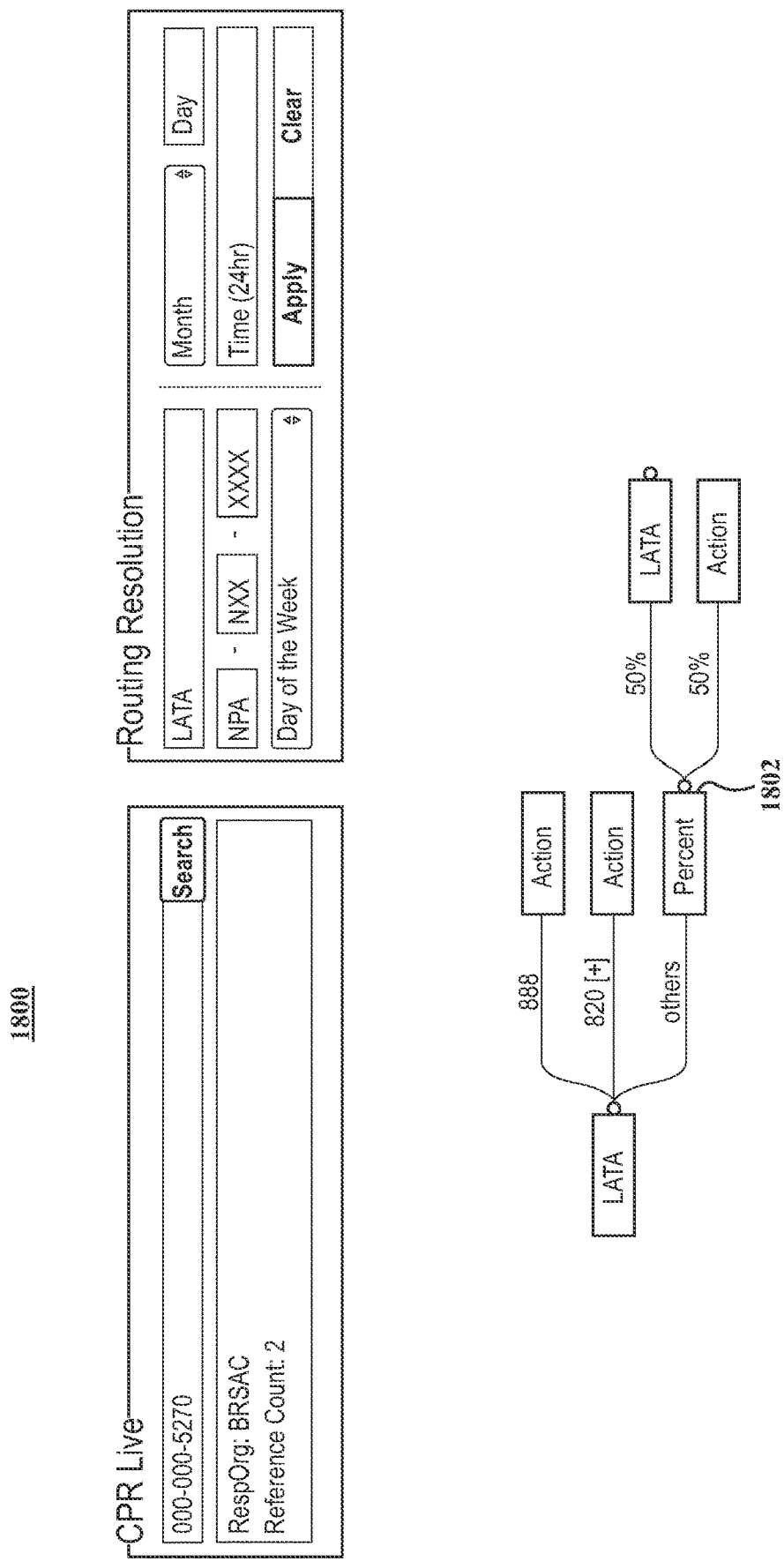

In exemplary and non-limiting embodiments and referring to FIGS. 16-20, users of the Data Distribution Hub interface may need the ability to see a graphical representation of a CPR associated with a TFN. In order to do this, in FIG. 16, the user may enter a TFN 1602 in a user interface screen 1600 that is accessible within the Data Distribution Hub and click a search button 1604. A CPR Tree may be displayed graphically with a CPR Viewer and in the instance of FIG. 16, an Action node 1606 is displayed. If there are multiple Decision Nodes at the top level, the CPR Viewer may display the multiple Decision Nodes as multiple trees within the CPR Viewer. For example, by clicking the Action node of FIG. 16, the display of FIG. 17 may be presented showing calling routing information associated with the CPR. In the example of FIG. 16, there are three decision nodes. In a first node 1700, an Action is presented for calls originating from the 888 local access and transport area (LATA), an Action node 1702 is presented for calls originating from the 820 (and other) LATAs, and for remaining LATAs, a decision node 1704 is presented for routing calls on a percentage basis. The plus symbol to the right indicates that other LATAs meet the criteria of the middle decision node and by clicking on the plus symbol, those LATAs are revealed. By clicking on circles to the right of any decision node, for example the Percent decision node in FIG. 17, further decision nodes are presented for calls meeting the decision criteria. The user may traverse the CPR Tree using the CPR Viewer, expand and collapse branches, and drill down into the details of the CPR Tree. In FIG. 17, by clicking the circle to the right of the Percent decision node, the display 1800 of FIG. 18 is presented.

In FIG. 18, the CPR Viewer reveals that the Percent decision node provides that 50% of calls are routed to LATA decision node and 50% to an Action decision node. By clicking the circle 1802 to the right of the LATA decision node, further decision and action nodes are displayed.

Figure 19:
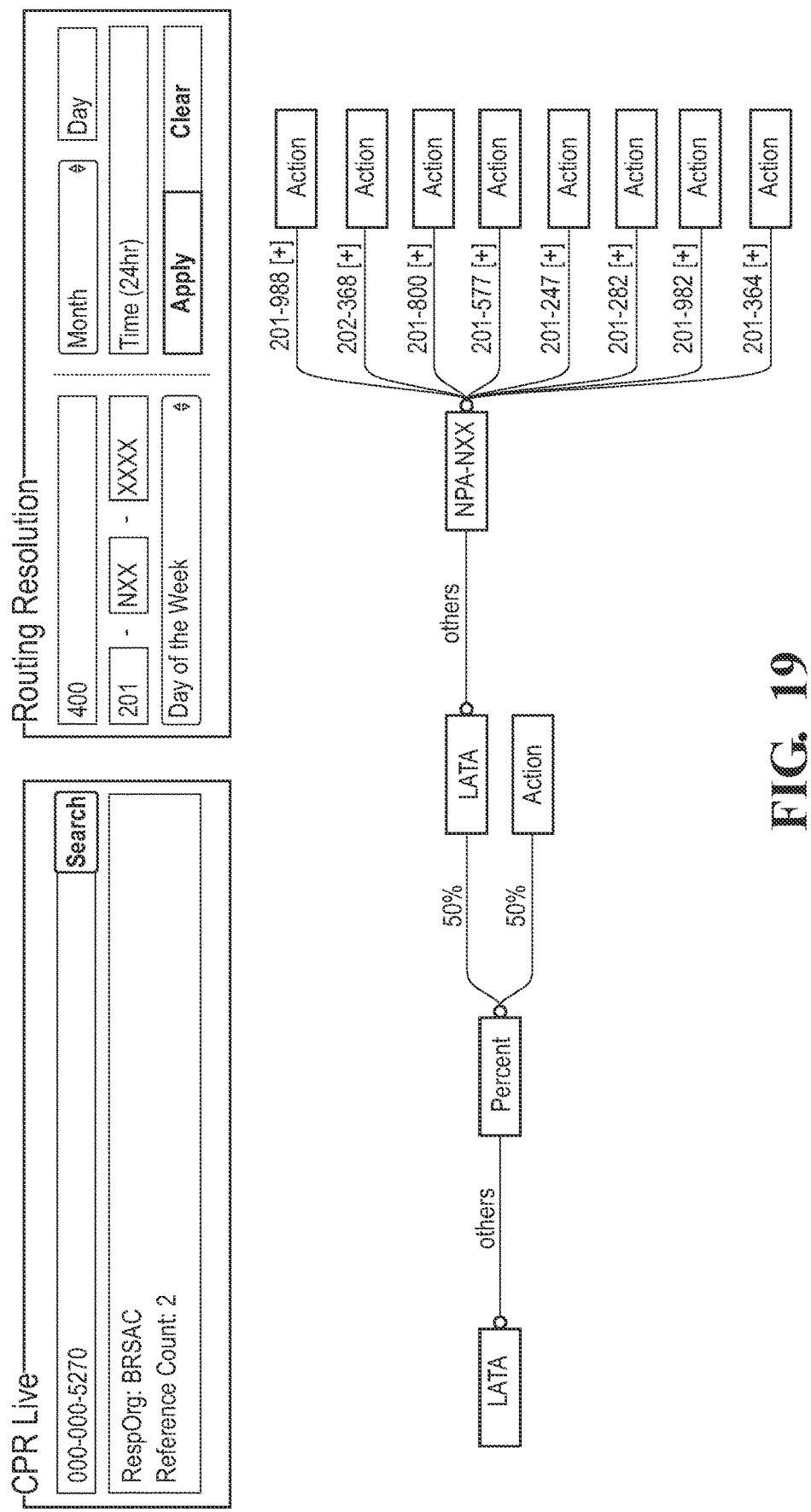

By utilizing the fields in FIG. 19, for example, the call routing tree may further be filtered to display only portions of the tree that meet filter criteria provides. In FIG. 19, 400 is provided as the originating caller LATA and 201 as the originating caller number plan administration (NPA), and the call routing tree is reduced to view the appropriate decisions and actions according to that criteria.

Figure 20:
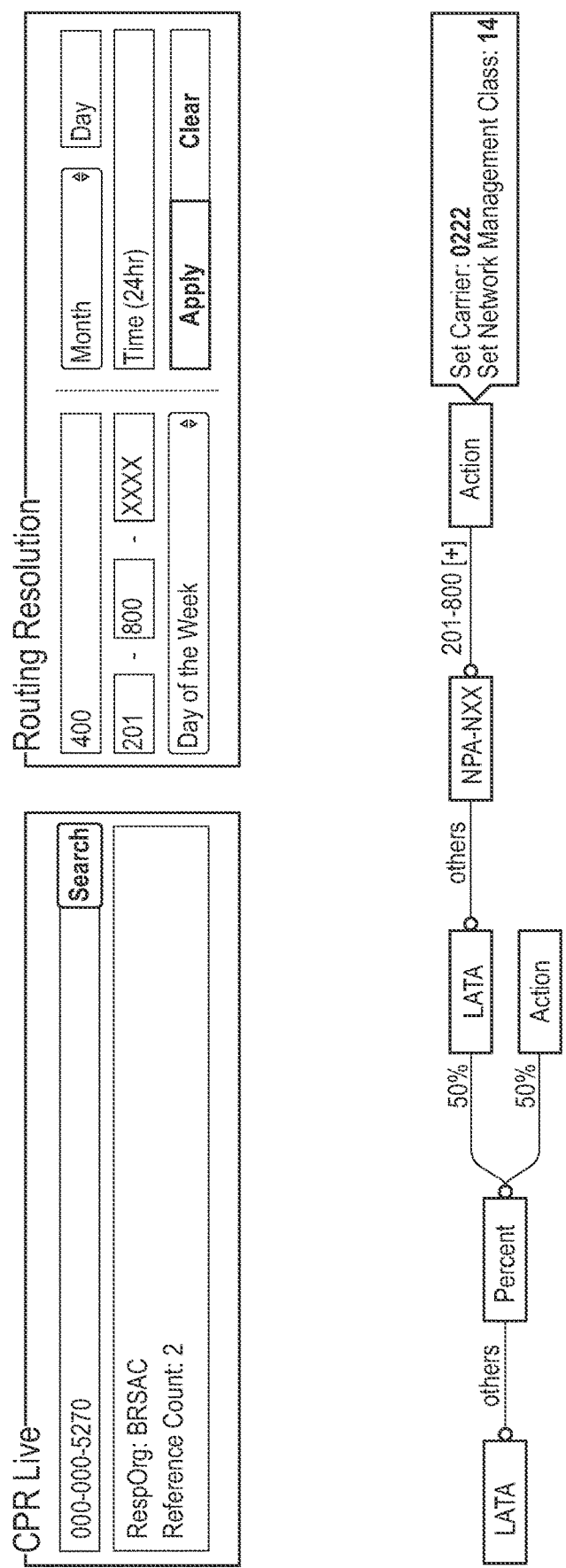

Further, in FIG. 20, 400 is provided as the originating caller LATA, 201 as the originating caller NPA and 800 as the originating caller NXX. As a result only portions of the call routing tree are provided that meet the calling criteria are displayed. Other filter data could, for example, be NPA-NXX-XXXX, the day of year, day of week, time of day and percent or any valid call routing decision criteria. Because many CPRs are very broad, and flat in structure, a user may be able to be used to filter criteria to specify some caller info parameters to 'test' the CPR, and details may be viewed to display the actions for a set of input parameters.

A subset of valid decision node types is listed, below:

| Value | Description |
| --- | --- |
| NPA | Match 3-digit ANI NPA |
| NXX | Match 3-digit ANI NXX |
| NPA-NXX | Match 6-digit ANI NPA-NXX |
| NPA-NXX-XXXX | Match 10-digit ANI |
| LATA | Match LATA passed in by querying entity |
| DOR | Day of year |
| DOW | Day of week |
| TIM | Time of day |
| PCT | Percent |

A subset of valid action node types is listed, below:

| Value | Description |
| --- | --- |
| SR10 | Set 10-digit routing number |
| SC | Set carrier |
| SFT | Set final treatment |
| SNMC | Set network management class |
| SLSO | Set local service office |
| STEMPLATE | Set template number used to re-query route information |

The binary CPR may be converted to the JSON format upon receipt from the STAR SCP subsystem. Both the binary and JSON CPRs stored in the database may use the same unique identifier. This allows the existing CallRoutingNumber to serve both binary and JSON CPR queries. When the JSON-capable Data Distribution Hub is initially installed, the existing (at rest) binary CPR data must be converted to their JSON equivalents. A standalone application may perform this conversion by iterating through all existing binary CPRs, removing any JSON CPR that may have a matching SHA1 hash value, and saving the newly converted JSON string. An additional logging configuration file may also be installed as part of the standard deployment. This file allows the conversion application to use the normal logging facility to write to its own log. A sample file is: /usr/share/tomcat/webapps/DDH/WEB-INF/classes/conversion-logback.xml. By default, the logging level may be set to INFO and the resulting log file placed in the directory from which the application is run. In order to run the application, the CLASSPATH environment variable may be set to:

CLASSPATH=/usr/share/tomcat/webapps/DDH/WEB-INF/classes:/usr/share/tomcat/webapps/DDH/WEB-INF/lib/*

To execute the application, the following command may be issued: java-Dlogback.configurationFile=conversion-logback.xml com.somos.util.app.ConvertMain. Note the use of the "-Dlogback.configurationFile=conversion-logback.xml" command line parameter. This may be necessary for the logging mechanism to properly initialize. Failure to provide this command line parameter may result in the application throwing an exception indicating insufficient permissions to write to the Data Distribution Hub application log file. This is a non-fatal condition, and the application will continue to perform the binary to JSON conversion.

In embodiments, rather than entering a toll-free number in FIG. 16 to determine call routing information associated with the number, a template identifier may be input to determine call routing information associated with a call routing template.

The user may view a TFN's CPR both in a Lab Environment as well as a Live Environment. A Lab Environment comprises using the data in a non-production environment and with non-production data. The data is a snapshot of real data that is static and not updated and thus cannot be used for actual routing, but can be used for integration and testing to validate call routing capabilities before using those capabilities in a Live Environment. Live Environment includes the live data that is updated from actual, valid call routing data. A CPR Viewer screen can be provided that allows a user the ability to specify the environment from which the user wants to retrieve a CPR.

The methods and systems described herein may be deployed in part or in whole through a machine that executes computer software, program codes, and/or instructions on a processor. References to a "processor," "processing unit," "processing facility," "microprocessor," "co-processor" or the like are meant to also encompass more that one of such items being used together. The present invention may be implemented as a method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be or include a frequency division multiple access (FDMA) network or a code division multiple access (CDMA) network. The cellular network may include mobile devices, cell sites, base stations, repeaters, antennas, towers, and the like. The cell network may be one or more of GSM, GPRS, 3G, EVDO, mesh, or other network types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples but is to be understood in the broadest sense allowable by law.

In further support of the above disclosure, U.S. Pat. No. 9,992,352 titled, TOLL-FREE TELECOMMUNICATIONS AND DATA MANAGEMENT PLATFORM, issued on Jun. 5, 2018 is incorporated by reference in its entirety herein.

What is claimed is:

1. A system comprising:
at least one processor; and
a memory device storing an application that adapts the at least one processor to:
interpret call routing data associated with a telecommunications identifier;
generate parsed data based at least in part on the call routing data; and
transmit the parsed data;
wherein the parsed data is structured for the call routing data to be displayed in a tree format on an electronic display.

2. The system of claim 1, wherein the tree format includes a decision node and an action node for visualizing the call routing data.

3. The system of claim 2, wherein the decision node is based upon criteria including at least one of: a numbering code, a day of a year, a day of a week, a time of day, or a percent.

4. The system of claim 2, wherein the action node includes at least one of: a set 10-digit routing number, a set carrier, a set final treatment, a set network management class, a set local service office, or a set template number used to re-query route information.

5. The system of claim 1, wherein the telecommunications identifier is a telecommunications number.

6. The system of claim 5, wherein the telecommunications number is a toll-free number.

7. The system of claim 1, wherein the telecommunications identifier is a telecommunications routing template.

8. The system of claim 7, wherein the telecommunications routing template corresponds to a toll-free number.

9. The system of claim 1, wherein the parsed data is further structured to interactively display portions of a date.

10. The system of claim 1, wherein the call routing data is included within a call processing record.

11. A method comprising:
interpreting, via at least one processor, call routing data associated with a telecommunications identifier;
generating, via the at least one processor, parsed data based at least in part on the call routing data; and
transmitting, via the at least one processor, the parsed data;
wherein the parsed data is structured for the call routing data to be displayed in a tree format on an electronic display.

12. The method of claim 11, wherein the tree format includes a decision node and an action node for visualizing the call routing data.

13. The method of claim 12, wherein the decision node is based upon criteria including at least one of: a numbering code, a day of a year, a day of a week, a time of day, or a percent.

14. The method of claim 12, wherein the action node includes at least one of: a set 10-digit routing number, a set carrier, a set final treatment, a set network management class, a set local service office, or a set template number used to re-query route information.

15. The method of claim 11, wherein the telecommunications identifier is a telecommunications number.

16. The method of claim 11, wherein the telecommunications identifier is a toll-free number.

17. The method of claim 11, wherein the telecommunications identifier is a telecommunications routing template.

18. The method of claim 17, wherein the telecommunications routing template corresponds to a toll-free number.

19. The method of claim 11, wherein the parsed data is further structured to interactively display portions of a date.

20. The method of claim 11, wherein the call routing data is included within a call processing record.

* * * * *